(12) United States Patent
O'Ceallaigh

(10) Patent No.: US 11,845,517 B2
(45) Date of Patent: Dec. 19, 2023

(54) VISCOUS-DRAG-REDUCING CLADDING

(71) Applicant: Micheal O'Ceallaigh, Dublin (IE)

(72) Inventor: Micheal O'Ceallaigh, Dublin (IE)

( * ) Notice: Subject to any disclaimer, the term of this patent is extended or adjusted under 35 U.S.C. 154(b) by 0 days.

(21) Appl. No.: 16/955,139

(22) PCT Filed: Dec. 21, 2018

(86) PCT No.: PCT/EP2018/086808
§ 371 (c)(1),
(2) Date: Jun. 18, 2020

(87) PCT Pub. No.: WO2019/122439
PCT Pub. Date: Jun. 27, 2019

(65) Prior Publication Data
US 2020/0317295 A1    Oct. 8, 2020

(30) Foreign Application Priority Data

| Dec. 22, 2017 | (IE) | 2017/0273 |
| Dec. 22, 2017 | (IE) | 2017/0274 |
| Jan. 26, 2018 | (IE) | 2018/0030 |

(51) Int. Cl.
*B63B 1/34* (2006.01)
*B63B 71/00* (2020.01)

(52) U.S. Cl.
CPC ............ *B63B 1/34* (2013.01); *B63B 71/00* (2020.01); *B63B 2221/10* (2013.01)

(58) Field of Classification Search
CPC ....... B63B 1/34; B63B 71/00; B63B 2221/10; B63B 1/38; B63B 2001/387
See application file for complete search history.

(56) References Cited

U.S. PATENT DOCUMENTS

| 1,445,839 | A |   | 2/1923  | Mahoney |
| 3,354,022 | A |   | 11/1967 | Dettre et al. |
| 5,141,031 | A | * | 8/1992  | Baurmeister ......... F28F 21/062 |
|           |   |   |         | 139/383 R |
| 5,456,201 | A |   | 10/1995 | Bobst |
| 5,591,511 | A | * | 1/1997  | Yasui .................. B21D 26/055 |
|           |   |   |         | 244/207 |
| 5,803,410 | A |   | 9/1998  | Hwang |
| 7,152,829 | B2 |  | 12/2006 | Bertolotti |
| 8,783,624 | B2 |  | 7/2014  | Koppelman et al. |
| 2010/0166964 | A1 | | 7/2010 | Go et al. |

FOREIGN PATENT DOCUMENTS

| WO | WO 2013/131618 A2 | 9/2013 |
| WO | WO-2013147478 A1 * | 10/2013 | ............... B63B 1/38 |

OTHER PUBLICATIONS

International Search Report from corresponding International Patent Application No. PCT/EP2018/086808, dated Jun. 4, 2019.

* cited by examiner

*Primary Examiner* — Stephen P Avila
(74) *Attorney, Agent, or Firm* — KUSNER & JAFFE

(57) ABSTRACT

A viscous-drag-reducing cladding for a ship's hull whereby the wetted area of the hull is reduced by interspersing air between the hull surface and the water. A substantial portion of the submerged area of the ship's hull comprises densely packed air pockets. The dimension of the air pocket is less than twice the capillary length of water. Each air pocket is supplied with pressurised gas by means of a restrictor. The pressurised air is supplied to each air pocket by means of a network of corrugated channels.

18 Claims, 17 Drawing Sheets

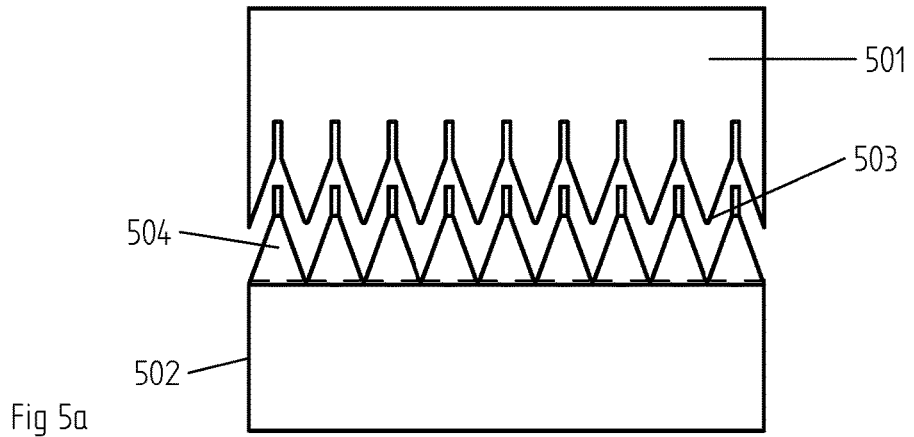
Fig 5a
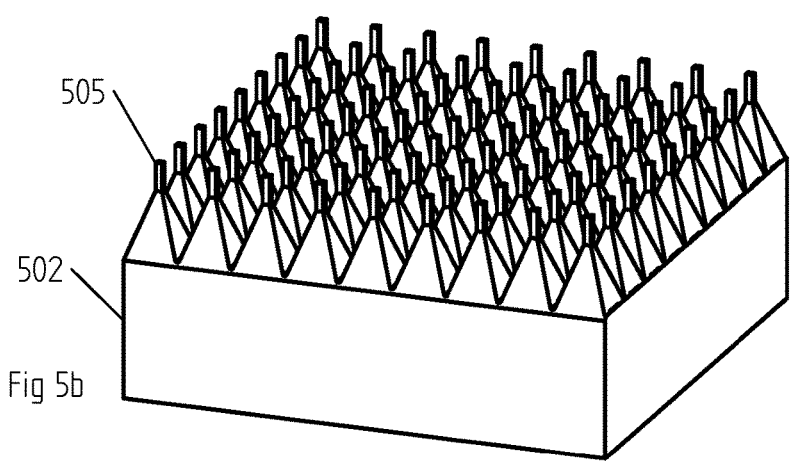
Fig 5b
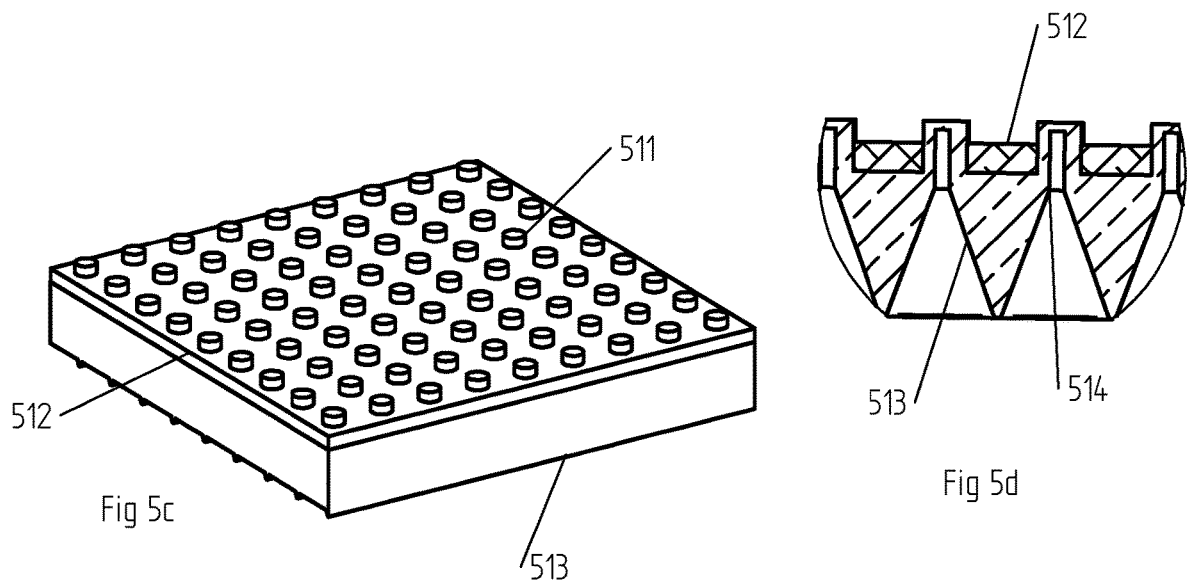
Fig 5c
Fig 5d

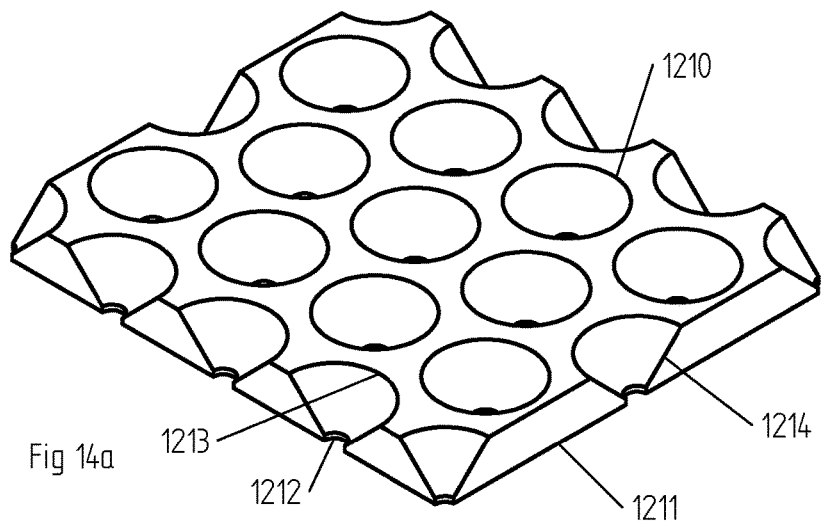
Fig 14a
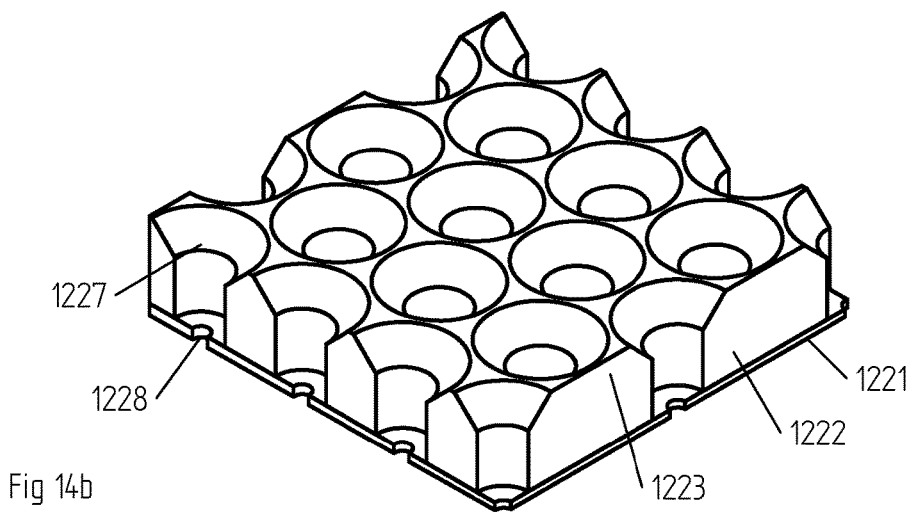
Fig 14b
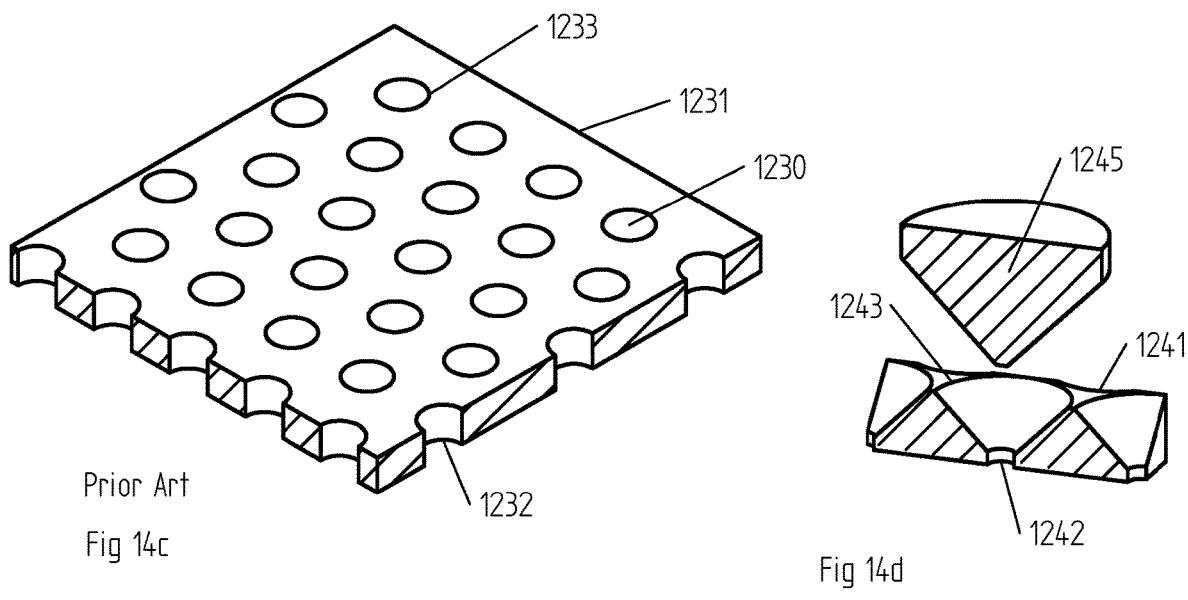
Prior Art
Fig 14c
Fig 14d

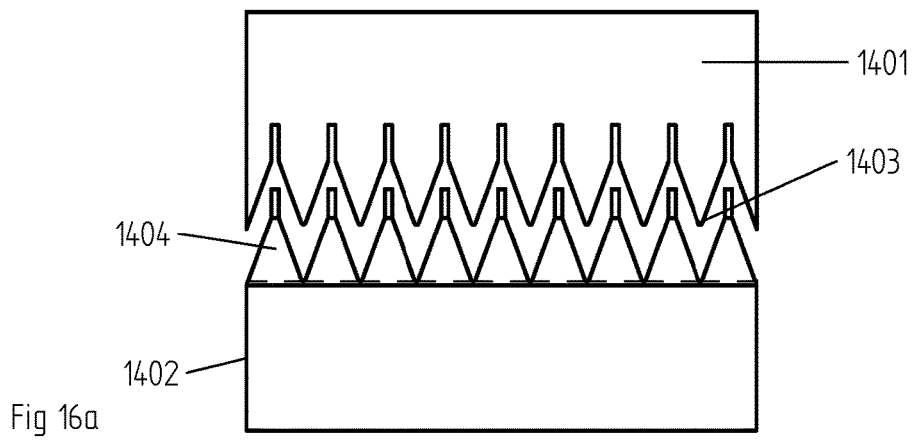
Fig 16a
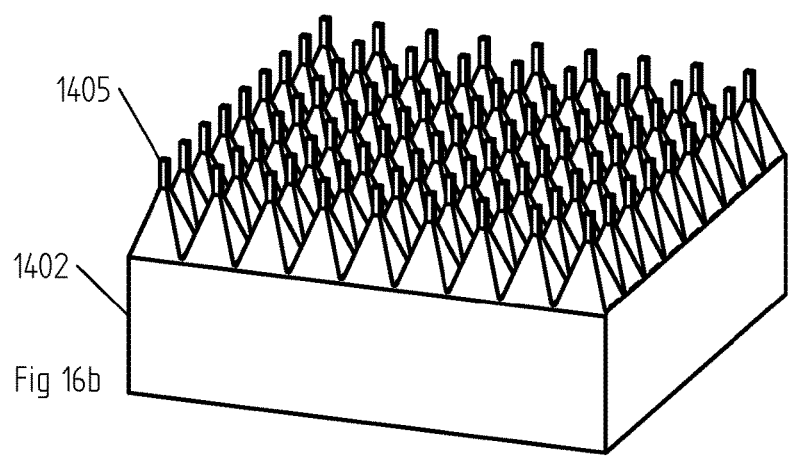
Fig 16b
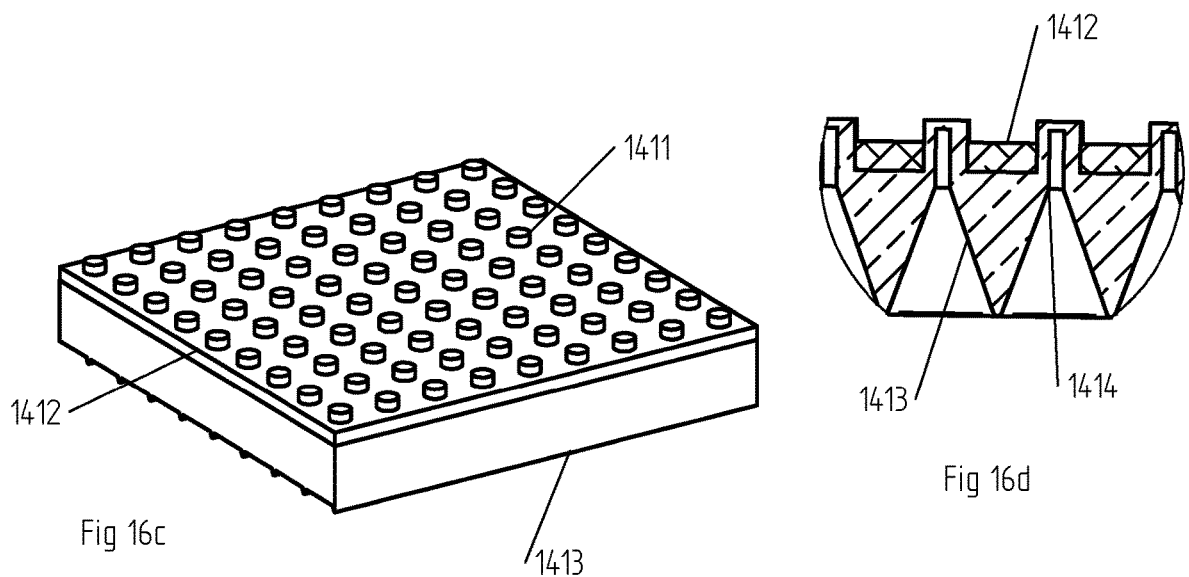
Fig 16c
Fig 16d

VISCOUS-DRAG-REDUCING CLADDING

FIELD OF THE INVENTION

The present invention relates to the reduction of viscous drag. In particular, the present invention relates to a viscous-drag reducing cladding.

BACKGROUND OF THE INVENTION

The present invention is directed to the reduction of the viscous drag, such as on the hulls of ships. It is also relevant to other marine vessels and objects that travel over water, or are submerged under water such as submarines, and torpedoes. It is also relevant to cases where liquid travels through pipes or ducts or other liquid containing structures, such as in the chemical industry where liquids such as oil are pumped along pipelines. Viscous drag accounts for most of the fuel required to propel large ships. As the shipping industry is a large global producer of greenhouse gases, so reducing fuel consumption due to viscous drag will result in large reductions in environmental damage and large economic savings.

Viscous drag occurs because of the phenomenon known in fluid mechanics as the 'no slip' boundary condition at the solid/liquid interface. The layer of liquid molecules adjoining the solid does not move relative to the solid. Shear forces are generated between this layer and the adjoining layers of liquid. This condition is known to apply to vessels moving through liquids, as is the case of ships travelling through the sea. It also applies in the case of liquid flowing through pipes, such as oil through a pipeline. Air has a viscosity approximately one thousand times smaller than water. It has long been known that if air can be interspersed between the liquid and solid in such a way as to completely separate the liquid from the solid, that the viscous drag in the liquid will effectively be eliminated.

Plants, such as the lotus leaf and certain insects exhibit the characteristic of trapping air on their surface. This effect is typically generated by a hydrophobic surface, along with a complex surface topography, often comprising hierarchical structures. This property greatly reduces their wetted surface areas. This non-wetting property is commonly known as 'the Lotus effect'. Many laboratory materials have been tested to replicate this effect seen in nature. While materials designed to mimic this effect may work briefly when tested just below the water surface, none have been shown to work over an extended time at the hydrostatic pressures encountered by the hulls of modern shipping. Hulls of 20 m depth are common today. They encounter hydrostatic pressures of 2 Bar, equivalent to 2 N/mm$^2$. The forces from such hydrostatic pressures are far greater than the surface tension forces that non-wetting materials rely on. This non-wetting behaviour is limited to near surface instances only. A further limitation of the 'Lotus effect' is that, over time, the trapped air diffuses into the water leaving the surface saturated with water. Materials replicating this principle would not be of benefit to ships that must spend a year or more between trips to dry dock. It is clear that such materials do not offer a solution to the problem of viscous drag on the hulls of ships.

U.S. Pat. No. 5,456,201 discloses a method of blowing bubbles through a ship hull. However, the holes themselves are large, causing the air that emerges to form large bubbles. Thus the hull surface remains wetted. This leads to the physical phenomenon known as 'bubbly flow'. The viscosity of the water is reduced leading to a reduction in the viscous drag force. However, bubbly flow also causes a reduction in the density of the water, and a reduction in its buoyancy force. The large power requirement necessary to produce the large volume flow of air bubbles tends to offset the power reduction from reduced viscous drag on the hull. As a result, this system has not found favour in industry.

Therefore there exists a need for a solution to the problem of viscous drag which would be suitable for use on ships and other marine vessels.

SUMMARY OF THE INVENTION

Accordingly the present invention provides a viscous drag reducing cladding comprising an outer surface with a plurality of air pockets therein, each air pocket having an air inlet and an outlet; wherein the cross-sectional area of each air inlet is smaller than the cross-sectional area of the air pocket's outlet.

The radius of each air pocket may be less than twice the capillary length of water.

The cross-sectional area of each air inlet may be less than one tenth of the cross-sectional area of the air pocket's outlet.

Each pocket may be conical in shape. The plurality of air pockets may be closely packed. The pocket outlets may overlap.

The outer surface of each air pocket may comprise a hydrophobic material. The hydrophobic material may comprise polytetrafluorethylene, PTFE, or perfluoroalkoxy copolymer resin, PFA.

The outer surface may comprise a plurality of loops of hydrophobic thread where the loops are attached to said surface at both ends.

The hydrophobic thread may comprise expanded polytetrafluorethylene, ePTFE, or perfluoroalkoxy copolymer resin PFA.

The outer surface may comprise strands of thread comprising of a hydrophilic core and a hydrophobic outer surface, and where one thread end is attached to the cladding outer surface and the other thread end is unattached.

The thread may comprise glass fiber thread.

The thread may comprise at least one of PTFE-coated stainless steel thread, PTFE-coated glass fiber thread, PFA-coated stainless steel thread or PFA-coated glass fiber thread.

The viscous drag reducing cladding may further comprise an air distribution system.

The air distribution system may comprise:
at least two corrugated sheets, at least one of which comprises multiple perforations; wherein the sheets are arranged so that the ridges of the corrugated profiles of at least two sheets are substantially orthogonal to each other thereby creating at least two air chambers each in communication with each other via the perforations.

The air distribution system may further comprise an air inlet in communication with one of said at least two air chambers.

The viscous drag reducing cladding may further comprise a plurality of air outlets formed in at least one substantially flat sheet, wherein each air outlet is in communication with the air inlet of one of the plurality of air pockets.

The air distribution system may comprise a wave-form sheet. The wave-form sheet may be bonded to a top sheet to form a single panel. A single plenum may be formed between the top sheet and the wave sheet. The viscous drag reducing cladding may further comprise a mounting sheet comprising receiver holes and welding dimples.

The viscous drag reducing cladding may be backfilled with polyisobutylene or other similar viscoelastic material.

An air distribution as described above also forms one aspect of the present invention.

The outer surface of the cladding may comprise three sheets aligned and bonded to each other in a sandwich construction. The viscous drag reducing cladding may comprise a thin central sheet bonded to two thicker sheets. The thin central sheet may have a thickness in the range from about 25 to about 200 microns. The thin central sheet may have a plurality of restrictor holes each forming an air pocket inlet. Each restrictor hole may be coated in a hydrophobic fluoropolymer coating.

The outer surface may comprise a fibrous surface tape bonded to a perforated sheet assembly.

The viscous drag reducing cladding may further comprise an open substrate. A hydrophobic fibrous layer may be bonded to the open substrate. The viscous drag reducing cladding may further comprise one or more layers of hydrophobic fibers and a single layer of hydrophobic fibers with an exposed hydrophilic core. The viscous drag reducing cladding may further comprise a foil bonded to a perforated metal sheet.

The viscous drag reducing cladding may further comprise a thermoplastic sheet bonded to a porous thermoplastic sheet. The viscous drag reducing cladding may be vacuum moulded on a male die comprising long thin needles to form air pockets in the two sheets. The viscous drag reducing cladding may comprise elongated air pockets wherein air flow emerging from each air pocket is substantially perpendicular to the outer surface.

The present invention further provides an air distribution system for a cladding system on a ship comprising:
- at least two corrugated sheets, at least one of which comprises multiple perforations; wherein the at least two sheets are arranged so that the ridges of the corrugated profiles of at least two sheets are substantially orthogonal to each other thereby creating at least two air chambers each in communication with each other via the perforations.

The air distribution system may further comprise an air inlet in communication with one of said at least two air chambers.

The air distribution system may further comprise a plurality of air outlets formed in at least one substantially flat sheet.

The present invention further provides a tape for coating the hull of a ship comprising
- a hydrophobic backing film comprising a front side and a back side, and
- a plurality of loops of hydrophobic thread attached to the front side of the hydrophobic backing film.

The back side may be configured for adhesion bonding. Said hydrophobic thread may be ePTFE thread.

The present invention further provides a tape for coating the hull of a ship comprising:
- a hydrophobic backing film, comprising a front side and a back side, wherein
- the back side of said tape is configured for adhesion bonding, and
- strands of thread comprising two ends, whereby one end is attached to the front side of said hydrophobic backing film, and
- wherein the other end is unattached, and
- wherein the outer surface of the thread is hydrophobic, and
- wherein the inner core comprises a hydrophilic material, and
- wherein the hydrophilic core is exposed at the unattached ends of each strand.

The thread may be PTFE-coated or PFA-coated stainless steel or glass fibre thread.

The present invention further provides a metal sheet with holes comprising
- a sheet with holes where the ratio of said sheet's thickness to the diameter of the holes is about 1:1 or less and
- a coating bonded to the holes and optionally one or both flat surfaces of said sheet, whereby
- the ratio of the coated sheet thickness to the diameter of its holes is greater than 2:1.

The coating may be electrolessly deposited nickel.

The present invention further provides a method of forming a metal sheet with conical holes comprising:
- perforating a metal sheet with cylindrical holes;
- stamping each cylindrical hole with a forming die having a conical base;
- coating the inside of each hole to reduce the size of the hole at the tip of the cone;
- applying a tape to the metal sheet and pressing the tape into the conical holes; and
- perforating the tape to further reduce the size of the hole at the tip of the cone.

According to a further aspect of the invention there is provided a cladding for a ship hull comprising a multitude of densely packed air pockets on its outer surface, where the scale length of the air pockets is less than twice the capillary length of water, and where the inlet of each air pocket is supplied with pressurised air via a restrictor, and where the area of the restrictor is less than one tenth of the area of the pocket's outlet, and where the inlet of each restrictor is connected to an air distribution system, and where the air distribution system is connected to at least one source of pressurised air.

The outer surface of each air pocket may comprise of a hydrophobic material. Said hydrophobic material may comprise PTFE.

The cladding surface may comprise loops of hydrophobic thread where the loops are attached to said surface at both ends. The hydrophobic thread may comprise ePTFE.

The surface may comprise strands of thread comprising of a hydrophilic core and a hydrophobic outer surface. One thread may be attached to the cladding surface and the other thread end may be unattached. Such thread may comprise PTFE-coated stainless steel thread.

The invention further provides an air distribution system for a cladding system on a ship comprising at least one air inlet and at least two corrugated sheets, at least one of which comprises multiple perforations and at least one substantially flat sheet, one of which comprises a multitude of orifices and whereby the sheets are assembled and bonded to each other so that the ridges of the corrugated profiles of at least two sheets are substantially orthogonal to each other thereby creating at least two chambers each in communication with each other via the perforations comprised therein such that air can enter through the inlet and pass through the chambers and exit through the multiple orifices of one of the flat sheets.

The present invention further provides a tape for coating the hull of a ship comprising a hydrophobic backing film comprising a front side and a back side, comprising loops of hydrophobic thread attached to the front side of hydrophobic backing film, and a back side that is suitable for adhesion bonding. Said hydrophobic thread may be ePTFE thread.

The present invention further provides tape for coating the hull of a ship comprising a hydrophobic backing film, comprising a front side and a back side, where the back side of said tape is suitable for adhesion bonding, and strands of thread comprising two ends, whereby one end is attached to the front side of said hydrophobic backing film, and whereby the other end is unattached, and whereby the outer surface of the thread is hydrophobic, and whereby the inner core comprises a hydrophilic material, and whereby the hydrophilic core is exposed at the unattached ends of each strand. The thread may be PTFE-coated stainless steel thread.

The present invention further provides a metal sheet with holes comprising a sheet with holes produced by conventional means where the ratio of said sheet thickness to the diameter of the holes is about 1:1 or less and a coating bonded to the holes and optionally one or both flat surfaces of said sheet, whereby the ratio of the coated sheet thickness to the diameter of its holes is greater than 2:1. The coating may be electrolessly deposited nickel.

Accordingly, there is provided a cladding for a ship comprising a multitude of densely packed air pockets on its outer surface, where the scale length of the air pocket is less than twice the capillary length of water, and where the inlet of each air pocket is supplied with pressurised air via a restrictor, and where the cross-sectional area of the restrictor is less than one tenth of the cross-sectional area of the pocket's outlet, and where the inlet of each restrictor is connected to an air distribution system, and where the air distribution system is connected to at least one pressurised air source. The air distribution system may be used to prevent biofouling of the cladding by occasionally passing an anti-fouling gas through the system instead of air. Typically the favoured anti-fouling gas comprises ozone.

The advantages of the invention are that the power consumption of marine vessels is reduced, as is their production of greenhouse gases. Other advantages of the invention are to increase the speed of marine vessels for a given fuel consumption rate, and to increase the travel range of marine vessels for a given fuel load, and to reduce the size of propulsive equipment required to propel a vessel at a given design speed. Another advantage of the invention is to increase the viability of more environmentally-friendly means of propulsion such as sail power and electric power. Another advantage of the invention is to provide a hull surface that is less prone to bio-fouling. Another advantage of the invention is to reduce the risk of invasive species pollution of marine environment. Another advantage of the invention is to provide a hull surface with increased thermal insulation. Another object of the invention is to reduce noise pollution of the seas which is now understood to be harmful to marine life.

The viscous-drag-reducing property of the present invention can be beneficially used in various applications such ships' and submarine hulls, torpedoes, oil and chemical pipelines, and the like.

The present invention further provides a method of reducing fouling on a ship's or other marine vessel's hull by applying PTFE tape to the hull surface by adhesion bonding.

The tape may be less than one millimetre in thickness. The tape may have been activated on one side by low pressure hydrogen plasma etching. The adhesion bonding may be effected by pressure-sensitive silicone adhesive.

The present invention further provides a ship or other marine vessel with PTFE tape adhesively bonded to its hull.

The present invention further provides a boundary layer control system for an aircraft comprising an outer surface comprising a multitude of closely-packed air pockets, with each pocket comprising an inlet and an outlet, where the outlet of each pocket adjoins the free stream, and where the inlet of each pocket adjoins a plenum, and where the area of each pocket inlet is less than half the area of said pocket's outlet, and where each plenum is connected to at least one source of pressurised air.

The pressure of said pressure source may be greater than the pressure on the aircraft surface. The pressure of said pressure source may be lower than the pressure on the aircraft surface. The aircraft may be an airplane. The aircraft may be an unmanned aerial vehicle. The boundary layer control system may also be suitable for a rotating machine blade.

The present invention further provides an aircraft with a boundary layer control system comprising an outer surface comprising a multitude of closely-packed air pockets, with each pocket comprising an inlet and an outlet, where the outlet of each pocket adjoins the free stream, and where the inlet of each pocket adjoins a plenum, and where the area of each pocket inlet is less than half the area of said pocket's outlet, and where each plenum is connected to at least one source of pressurised air.

The present invention further provides a rail vehicle with a boundary layer control system comprising an outer surface comprising a multitude of closely-packed air pockets, with each pocket comprising an inlet and an outlet, where the outlet of each pocket adjoins the free stream, and where the inlet of each pocket adjoins a plenum, and where the area of each pocket inlet is less than half the area of said pocket's outlet, and where each plenum is connected to at least one source of pressurised air.

The present invention further provides a road vehicle with a boundary layer control system comprising an outer surface comprising a multitude of closely-packed air pockets, with each pocket comprising an inlet and an outlet, where the outlet of each pocket adjoins the free stream, and where the inlet of each pocket adjoins a plenum, and where the area of each pocket inlet is less than half the area of said pocket's outlet, and where each plenum is connected to at least one source of pressurised air.

The present invention further provides a missile with a boundary layer control system comprising an outer surface comprising a multitude of closely-packed air pockets, with each pocket comprising an inlet and an outlet, where the outlet of each pocket adjoins the free stream, and where the inlet of each pocket adjoins a plenum, and where the area of each pocket inlet is less than half the area of said pocket's outlet, and where each plenum is connected to at least one source of pressurised air.

The present invention further provides an air distribution system for a boundary layer control system of an aircraft comprising a substantially flat outer sheet comprising a multitude of orifices bonded to at least one corrugated sheet, where the corrugated sheet adjoining the substantially flat outer sheet is oriented in the span-wise direction so as to form a series of plenums oriented in the span-wise direction, and where each plenum is in connected to a pressurised air source.

The corrugated sheet adjoining the outer sheet may comprise perforations. The plenums may be connected to said pressurised source via said perforations.

Each corrugated sheet that is bonded on its outer surface to said outer sheet and oriented in the span-wise direction may be further bonded on its inner surface to a second corrugated sheet which is oriented in the chord-wise direction.

Other objects and advantages of the present invention will become apparent from the following description and accompanying drawings.

BRIEF DESCRIPTION OF THE DRAWINGS

The accompanying drawings, which are incorporated into and form a part of the disclosure, illustrate embodiments of the invention and, together with the description, serve to explain the principles of the invention.

FIGS. 5a and 5b illustrate embodiments of tools which may be used to produce the pressurisable air pockets of the cladding of the present invention according to a replication method. FIGS. 5c and 5d illustrate the outer surface (top sheet) of one embodiment of cladding during its production.

FIGS. 14a & 14b, illustrate alternative embodiments of cladding in accordance with the present invention. FIG. 14c illustrates a prior art aperture for comparison. FIG. 14d illustrates a cross-sectional view of a hole in a sheet at an intermediate stage of production along with the die used to form said hole in accordance with one aspect of the present invention.

FIGS. 16a and 16b illustrate embodiments of tools which may be used to produce the pressurisable air pockets of the cladding of FIGS. 14 and 15 according to a replication method. FIGS. 16c and 16d illustrate the outer surface (top sheet) of one embodiment of cladding during its production.

DETAILED DESCRIPTION OF THE INVENTION

Figure 1:
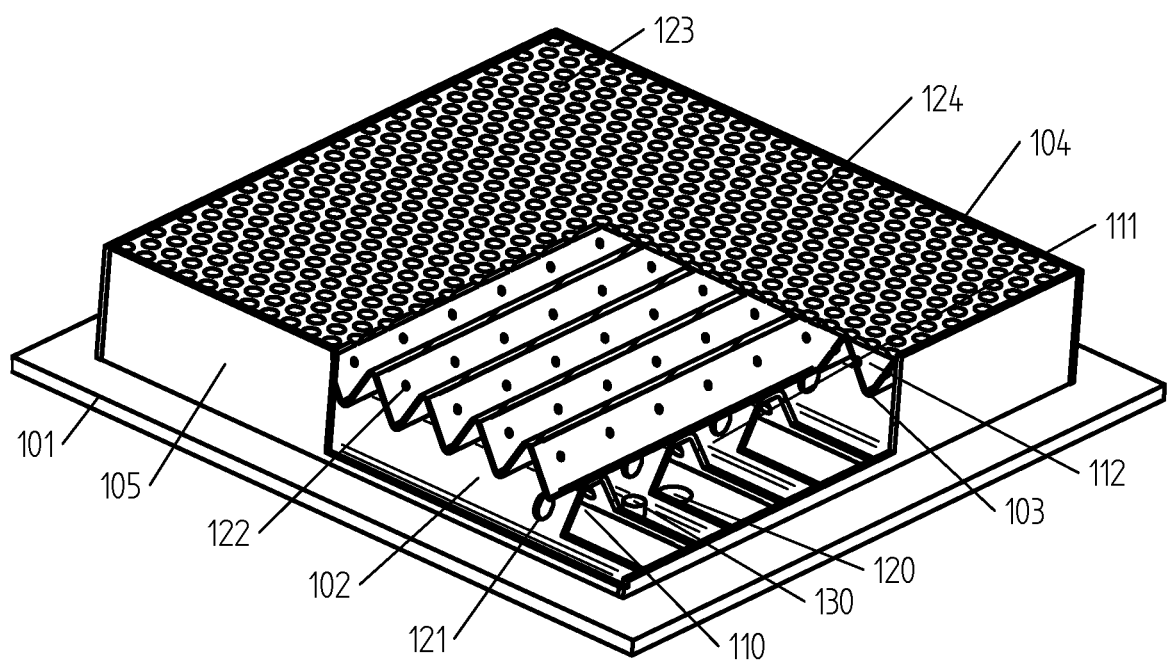
FIG. 1 illustrates an isometric view with a broken out section of an embodiment of a viscous-drag-reducing panel used as a cladding in accordance with the present invention.

One embodiment of a viscous drag reducing cladding of the present invention is shown in FIG. 1. The top (outer) surface of the cladding comprises top sheet 104 comprising a multitude of closely-packed air pockets 124 where the diameter of the outer surface, which is adjacent to the water in the case of a ship, is larger than the inner diameter which might be adjoining the body of a ship. Pressurised air is supplied to the inside of each air pocket, and operates to keep water out of the pocket, and to eject any water that should enter the pocket. The pressurised air is supplied in this embodiment by an air distribution system comprising formed sheet metal elements 102 & 103 that are assembled in a way as to create air chambers 110, 111 & 112. Air flows from one chamber to the next via apertures in the sheets 121 & 122. This air distribution system provides substantially equal pressure over a large section of hull surface area or the surface area of the object to which the cladding is applied. The operation of the invention is explained in detail in the paragraphs that follow, as are methods of manufacturing suitable embodiments.

It is useful to first explain some of the terms that are used in the following description. The invention is described in terms of the viscous drag reduction on a ship's hull travelling through water. However, the invention also relates to vessels and objects such as submarines and missiles travelling though fresh water or seawater. It also relates to oil, water, or other liquids being pumped along a pipeline. Hereinafter, the term ship shall be used to describe any ship, submarine, torpedo, pipeline or any other solid object whose surface is normally subject to viscous drag from its relative movement with respect to a liquid. Hereinafter, the term water shall refer to water, oil or any other liquid in which the viscous drag occurs. The term hull shall refer to the surface of the ship that immediately adjoins the water. The invention is described in terms of a ship moving through a liquid, but also applies also to a liquid moving through a fixed structure such as a pipeline. The cladding surface that adjoins the water is referred to as the outer surface. The opposite cladding surface that adjoins the hull is referred to as the inner surface.

The term 'wetted area' of a hull is normally used to describe the area of a ship's hull surface that lies beneath the waterline. Prior to this invention, all of the submerged area was wetted, so there was no need to distinguish between the 'wetted area' and the 'submerged area'. Hereinafter, the term 'submerged area' shall refer to the area of the ship's hull surface that lies below the waterline. The term 'wetted area' shall refer only to that portion of the 'submerged area' that is wetted by water. The 'non-wetted area' is the area of the hull surface below the waterline that is not wetted. The internal area of the pockets, as explained later with reference to the drawings, is not included in this calculation. The 'percentage non-wetted area' is the 'non-wetted area' expressed as a proportion of the 'submerged area'. The 'percentage non-wetted area' is a useful measure of the efficiency of this invention and correlates with the proportion of viscous drag reduction. This invention is described in terms of a cladding covering the entire submerged area of a ship's hull, but the cladding may beneficially be applied to just a portion of this.

When a drop of water, in its steady state, makes a contact angle of greater than 90° on the surface of a material, the material is said to be hydrophobic. When the liquid drop consists of oil, the material is said to be oleophobic. In general, when a drop of any liquid makes a contact angle of greater than 90° on the surface of a material, the material is said to be non-wetting to that liquid. Hereinafter, the material property of hydrophobicity shall refer to the non-wetting characteristic of the material by the liquid, regardless of what the liquid comprises.

When the contact angle of water on a material is less than 90°, the material is said to be hydrophilic. The surfaces of most modern ships' hulls consist of steel, aluminium, fiberglass, copper, and copper-based paints are known to be hydrophilic.

In one embodiment of the present invention this invention, the outer surface is hydrophobic. This ensures that the surface tension acts to resist water wetting the pressurised air pockets, as are described later. When a hydrophilic surface is used, a higher third stage chamber pressure is required to clear restrictors that become blocked. This in turn leads to higher air consumption in the normal operation when the pressurised air pockets are not blocked. Such a system is less desirable. Preferred hydrophobic surfaces are PFA (perfluoroalkoxy copolymer resin) and PTFE (polytetrafluoroethylene), but many other fluoropolymers are also suitable. So too are materials such as silicone rubbers, fluoroelastomers, polyethylene, ePTFE, hydrocarbon and silicone oils and waxes. The hydrophobicity property is important to the surface only. The bulk material from which the hull is made may be of any suitable material. When the material is not hydrophobic, it may have a coating or surface treatment that renders it hydrophobic. PTFE and PFA both have the additional benefit of being resistant to fouling, which is also a desirable property for this invention.

The pressurising gas is referred hereinafter as air, but may be any suitable gas. The gas may also comprise a biocidal gas, such as ozone, when carrying out an anti-fouling treatment on the ship's hull. Such a treatment may be carried out from time to time as part of an anti-pollution program. When air is used, it is preferably dry, so that condensation does not form on any part of the air pumping system. Moist air should be dried by any suitable means, as known to those skilled in the art. The air may also be filtered to ensure that no particulates that could block the restrictors are forced though the compressed air system. The pressurised air may be supplied by a compressor, or from a storage tank. In the case of torpedoes, the compressed air may be the product of a chemical reaction.

Where reference is made to sheet metal it should be appreciated that other, non-metallic materials are also suitable, and sheets of such materials shall be referred to hereinafter as sheet metal. Polyester-bonded fiberglass and epoxy-bonded carbon fiber are two such preferred materials that are commonly used in leisure craft. Where reference is made to marine-grade stainless steel, aluminium and other metals may also be used.

In fluid mechanics, the term 'capillary length' is used to define the length scale below which the surface tension force of a liquid is significantly greater than the gravitational force. It is defined as the square root of the liquid's surface tension divided by its density multiplied by gravity. For water this value is 2.7 mm. This indicates that a drop of water falling through air will have a substantially spherical shape when its radius is less than 2.7 mm. It is observed that when the size of a single free-falling drop is more than double this it will tend to break up into smaller drops. This effect also applies to air bubbles in water. It should be noted that the capillary length of oil, at less than 2 mm, is less than that of water. This is primarily because the surface tension of water is substantially higher than that of oil. The present invention can establish a substantially complete air phase within the pressurised air pocket, and aims not to allow the air to break up into separate air bubbles, as happens when the pocket diameter is significantly larger than the capillary length. To be most effective, the radius of the air pocket may be less than twice the capillary length. When the shape of the surface of the air pocket is not circular, the radius shall mean the radius of an equivalent circle of the same area.

Prior to this invention, there was no known method of supplying air to a multitude of pressurised air pockets over a wide surface area of a ship's hull. Supplying air via the known methods of interconnected pipework or ducting would not be feasible in the limited space of a ship's cladding. Furthermore a multitude of connections would be required. Pressure drops along the pipework would have a detrimental effect on the operation of this invention. A suitable method of delivering air throughout the cladding has been invented, and is hereby disclosed.

Figure 4:
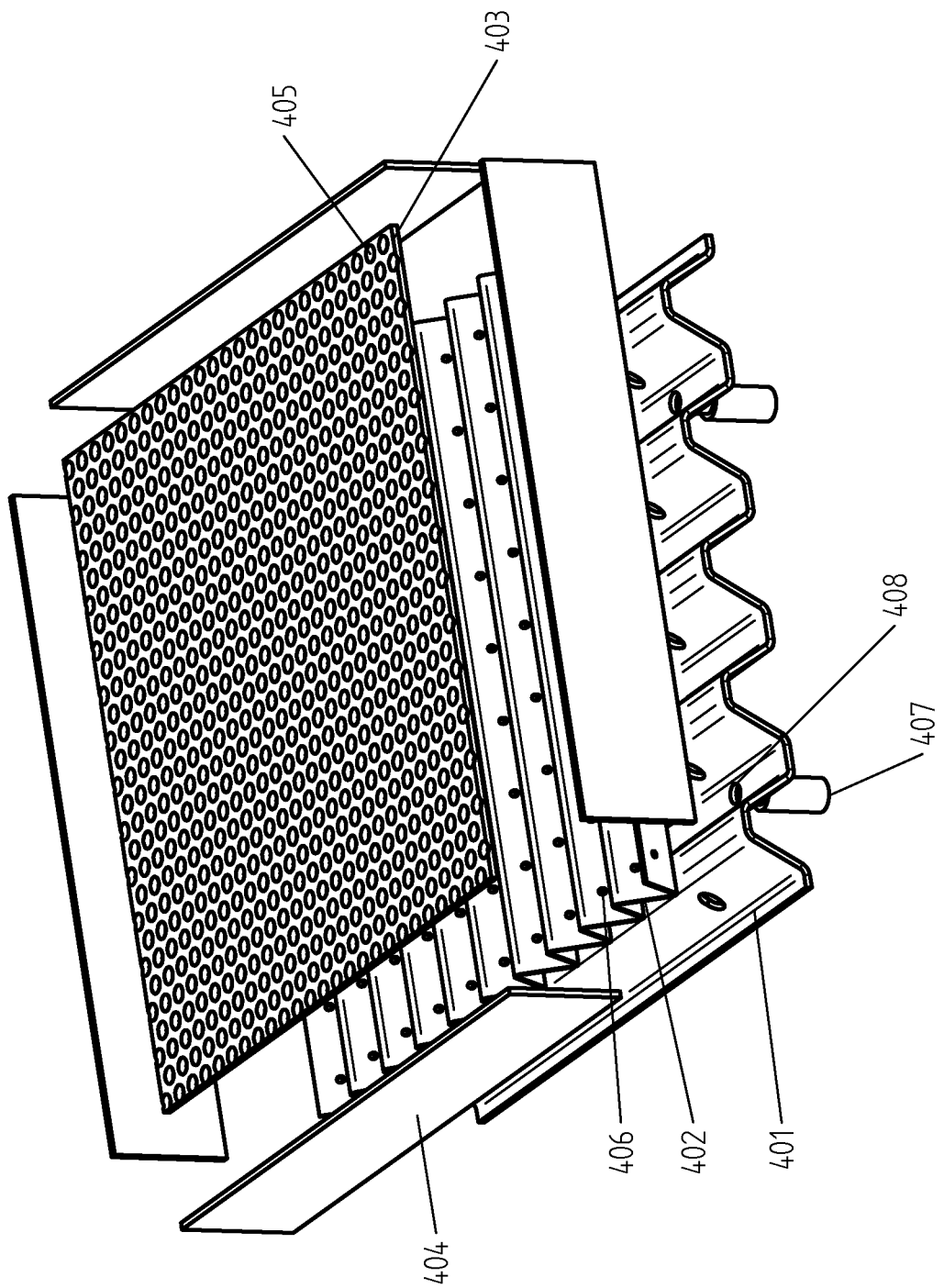
FIG. 4 illustrates an exploded view of an embodiment of the cladding of the present invention.

Referring to the embodiment of cladding shown in FIG. 1, base sheet 102, corrugated sheet 103, and top sheet 104 are bonded together. This is conveniently done in sections. Side sheets 105 are attached and function to seal that section of the cladding from adjoining sections. The side sheets 105 may conveniently be part of the base sheet 102 but are described as separate sheets for convenience. Such an assembly will hereinafter be referred to as a 'panel'. The panel has mounting brackets 130 attached to it, where it can be conveniently bolted or welded to the ship's hull 101. If convenient, the mounting brackets are hollow and also function as air inlet holes. The air inlet is connected by means of thru hull 120. When assembled, the ship's hull 101, and the base sheet 102 combine to form a series of interconnected lengthwise spaces hereinafter referred to as 'first stage chambers' 110. When assembled, the base sheet 102, and the corrugated sheet 103 combine to form a series of interconnected spaces hereinafter referred to as 'second stage chambers' 111. The corrugated sheet 103 and the top sheet 104 combine to form a series of spaces hereinafter called 'third stage chambers' 112. Referring to FIG. 4, the exploded view of a panel illustrates how the complex task of distributing air evenly to each air pocket using simple sheets of formed sheet metal is achieved. The panel consists of a base sheet 401, a corrugated sheet 402, a top sheet 403 and four side sheets 404, and hollow mounting brackets 407 which in this instance act also as air inlet duct, and are connected in line with the air inlet holes 408.

Referring again to FIG. 1, in use, pressurised air may be supplied via the thru hull 120, and flow into the first stage chambers 110. From there it flows through the apertures 121 to the second stage chambers 111 and into the other adjoining first stage chambers 110. The air flows from the second stage chambers 111 through the perforations 122 to the third stage chambers 112, and from there through the pressurised air pockets 123. The pressure distribution is largely even along the length of each first stage chamber. The base sheet contains several perforations 121 that allow air to pass from the first stage chamber into each second stage chamber. The corrugated sheet 103 contains several small perforations that allow air to pass from the second stage chamber into each third stage chamber. The locations and dimensions of the holes are adapted to ensure an optimum air flow from the air inlet to the third stage chambers. For instance, fewer holes, and holes of smaller diameter are preferable near the air inlet port 120, then in the outer corners 123. The pressure is substantially uniform throughout each third stage chamber, and is substantially equal in all third stage chambers in each panel. The sheets are designed so that the resistance to air flow in two dimensions across the length and width of the assembled panel is much lower than the resistance to air flow in the orthogonal direction through the panel. The sheets are bonded to each other by known methods such as welding or adhesion bonding.

Figure 8:
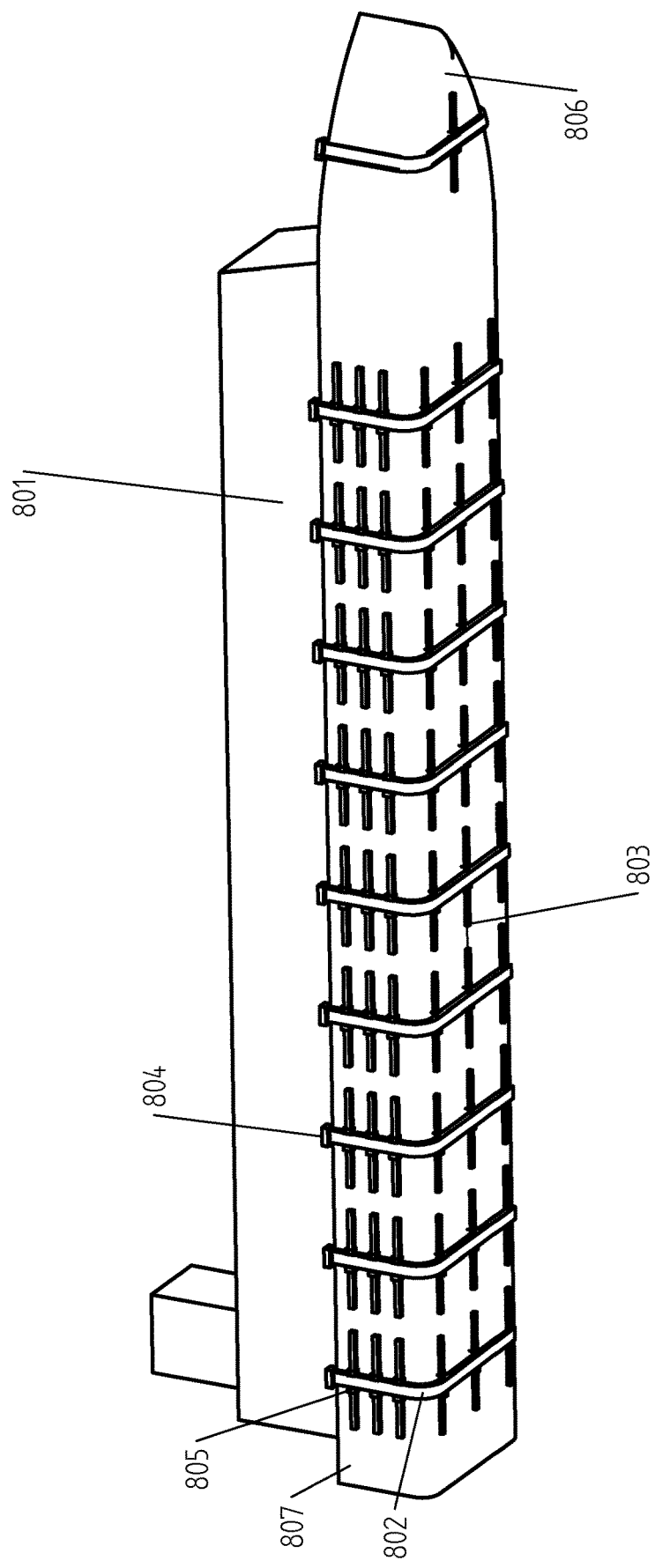
FIG. 8 illustrates an embodiment of an air distribution system for a ship in accordance with one embodiment of the present invention which is installed without the use of thru hulls.

In certain cases, as when retrofitting existing ships, fitting a pipe network internally throughout the submerged portion of the ship is not feasible or desirable. An additional framework may be attached to the external surface of the ship 801, as shown in FIG. 8. The framework is connected to a source of pressurised air at connections 804. The framework consists of a number of main channels 802, and with several subsidiary channels 803 connected to each one.

The sea pressure varies across the hull of a ship. It increases by about one Bar for every ten meters of depth below the waterline. The waterline itself varies with how heavily the ship is laden. When the ship is under way, a dynamic pressure difference arises, with the bow of the ship encountering a higher pressure, and the stern encountering a lower pressure. Typically, the highest pressures encountered by the hull are about region 806. This pressure reduces towards the stern of the ship and with decreasing depth. Lowest pressures are near the waterline and towards at the stern 807. Furthermore, variations in pressure occur due to the sea state. The sea pressure on the hull increases as the wave passes. As will be explained later, the supply pressure to each panel must be higher than the highest sea pressure each panel encounters. For larger vessels, there are significant differences in the values of this minimum supply pressure according to the location of the hull. Larger vessels with a 20 meter draft experience a 2 Bar pressure difference. A 10 m wave will cause a 1 Bar pressure fluctuation. Smaller vessels that ride the waves and have shallower beams experience much lower pressure ranges on their hulls. Reducing the supplied air pressure to close to the minimum required by that region reduces the consumption of pressurised air. Accordingly, pressure controllers 805 are installed within the channels at the connection points between the main and subsidiary channels and are used to control the pressure level in the third stage chambers in each hull region. Individual panels are secured to the hull of the ship. An air supply connection is then established between each panel and a subsidiary channel. The pressure in the main channels 802 is greater than the maximum pressure encountered by the ship while under way. Air flows from the pressure source to the main channel, and from there to the subsidiary channels, and then through the pressurised air panels and exits through the pressurised air pockets into the sea. This simple, low profile system distributes the air throughout the external surface of the ship, without drilling any thru hulls, and without the need to substantially rearrange the ship's internal spaces. The connections 804 are above the waterline. The main and subsidiary channels and the pressurised panels are attached to the hull by welding or by adhesion bonding, without drilling any thru hulls. In tall building construction, the curtain walling sector has developed many useful techniques for mounting panels, and designing internal drainage systems, and those skilled in the art will readily apply such techniques to the design and mounting of the invented viscous-drag-reducing cladding.

A highly satisfactory air distribution network, comprising simple materials and constructed using methods common in the ship building industry has thus been invented and disclosed. The above disclosed air distribution network delivers a controllable pressure and flow rate in a low profile cladding system across the submerged area of the ship's hull. This makes it highly suitable as a cladding system for ships.

Figure 2A:
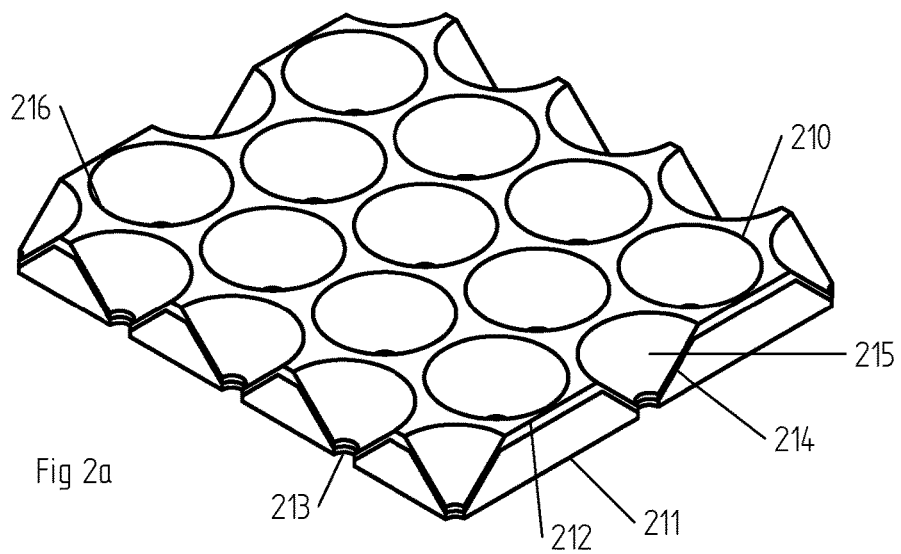
FIGS. 2a & 2b illustrate embodiments of viscous drag reducing cladding in accordance with the present invention.
Figure 2B:
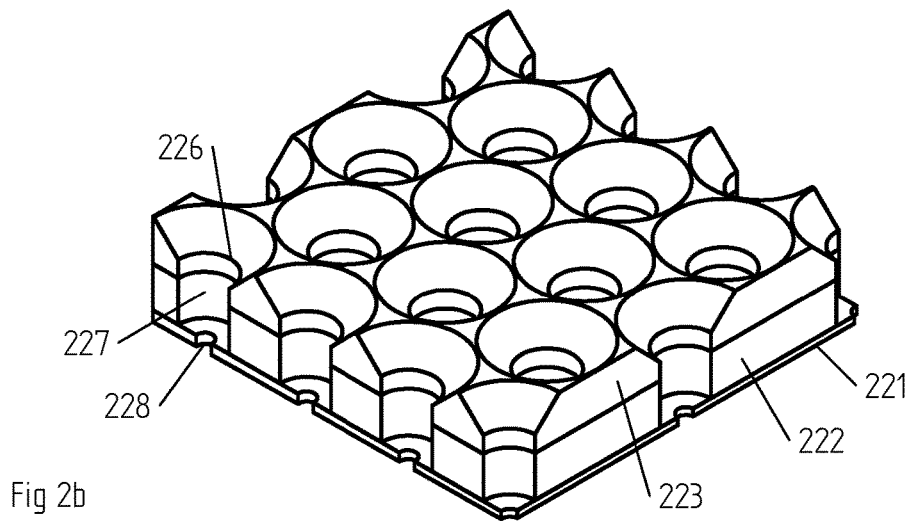
Figure 2C:
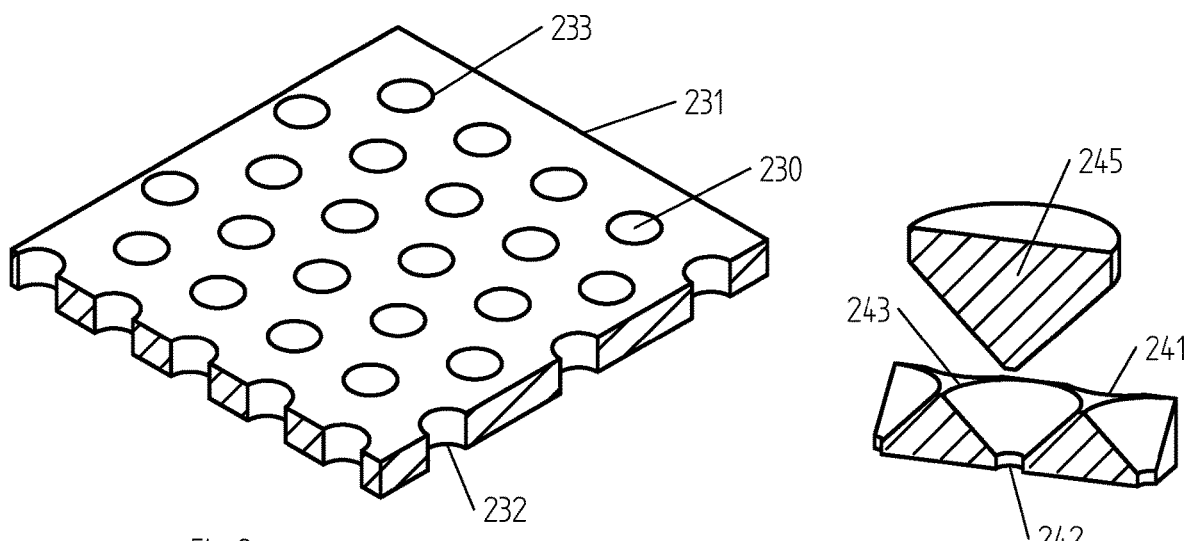
FIG. 2c illustrates a simple aperture for comparison.

Referring to FIGS. 2*a*, 2*b* and 2*c*, each figure shows an outer surface of one embodiment of cladding. The air inlet acts as a restrictor. The operation of a restrictor may be understood by examining the pressurisable air pocket 210 which incorporates a restrictor as illustrated in FIG. 2*a*. In particular, its operation can be favourably compared with an aperture 230 which does not incorporate a restrictor, as illustrated in FIG. 2*c*. Referring to FIG. 2*a*, for clarity, the area of the air pocket is defined as the cross-sectional area at its outlet, which is the circular area of outlet 216. The area of the restrictor is the cross sectional area of the restrictor at its narrowest section 213. The functioning of a restrictor is important to the efficient operation of this invention, as is explained in the paragraphs that follow.

Referring to FIG. 2*c*, when air flows across the unrestricted pressurised air pocket 230, only a small pressure drop occurs, as explained below. The air pressure in the chamber adjacent to the hole inlet 232 is very close to that at the outlet 233. Those skilled in the art will recognise that for this invention to be most effective a large percentage open area is required where the holes comprise as large a percentage of the sheet area 231 as possible. They will also recognise that the geometry of the holes 230 is restricted by production limitations so that the holes' diameter is at least as large as the sheet thickness. The design goal of a large open area combined with production limitations of holes with an aspect ratio of less than about 1:1 necessarily result in a minimal resistance to air flow across a thin sheet of this design. This results in a limitation where the pressure drop across the sheet may be lower than the pressure fluctuations that the hull encounters from waves and currents when at sea. This limitation is overcome by forcing very high flow rates of air through the holes 230. For instance, a large wave of ten metres height increases the pressure on the ship hull underneath it by approximately one Bar. This is greater than the maximum feasible pressure drop across the top sheet 231. When a sudden increase in the sea pressure occurs, an air pocket of this design will be blocked, as the pressure drop across the pocket is less than the rise in the sea pressure.

Once the pocket becomes blocked, and there is insufficient pressure at the inlet 232 to clear the blockage, it will remain blocked. The viscous drag reduction benefits will be lost. In such a design, there is the further risk that the air distribution chambers within the cladding will become flooded. Therefore, closely packed air pockets made to the design of FIG. 2c are not desirable.

By contrast, FIGS. 2a and 2b, illustrate embodiments of cladding having air pockets which incorporate restriction on the air flow. When air flows from an air chamber through the air inlet (also referred to herein as the restrictor) 213 into the air cavity 215 and escapes through its outlet 216 a significant pressure drop occurs. When the pocket outlet 216 is blocked, the pressure in the air cavity 215 increases rapidly to the pressure at the restrictor inlet. This pressure is sufficient to clear the blockage, and return the pocket to its un-wetted state. The air supply system, the restrictor size, and overall pocket geometry are designed such that this pressure drop is larger than the sea pressure fluctuations encountered by the vessel and rapidly clear any blockages. The pressure at the restrictor inlet remains higher than the increased sea pressure, and thus eliminates the risk of the internal air distribution chambers being flooded. In the case of oil being pumped through a pipeline, pressure fluctuations will occur from the pumping action. A pressure differential will also exist in the pipe due to gravity. There should be a positive drop in pressure across the restrictor at all times to ensure that the internal chambers do not become flooded. Where the air pressure control system relies on passive control, then the minimum design pressure drop across the restrictor must be greater than those fluctuations. However, when the air pressure in a panel or group of panels is actively controlled by flow controllers, then the design pressure drop across the restrictor need only be greater than the pressure difference encountered by the outer surface of each panel at any point in time. For example, a 2 m by 1 m panel may be mounted vertically on the side of a ship, with its long side in the horizontal direction. It will encounter roughly 0.1 Bar difference from top to bottom of the panel. While moored in static water, it will not encounter any pressure difference along the 2 m from front to back. When under way, or subject to currents, a dynamic pressure will develop, but will typically be much less that the variation in pressure due to the water depth. Similarly, a panel mounted on the bottom of a flat-bottomed hull will see no pressure fluctuation when static.

Those skilled in the art will recognise that larger ocean going vessels will regularly encounter waves of over 5 meters and encounter a dynamic pressure fluctuation of 0.5 Bar. For such vessels, an air supply system that actively controls the supply pressure ensuring an even air flow over time throughout is most beneficial. It can reduce the air consumption significantly. For smaller vessels that ride the waves, such an air control system may not be necessary.

A useful indicator of restrictor effectiveness is the ratio of the pocket area to the restrictor area. Hereinafter, this shall be referred to as the 'restrictor size ratio'. Another useful design indicator is the ratio of the sheet thickness to the restrictor diameter. Hereinafter this shall be referred to as the 'restrictor aspect ratio'. It is desirable that these be designed together with the air supply control system to ensure that the pressure drop across the restrictor exceeds the pressure fluctuations encountered during operation at all times.

FIG. 2a illustrates a suitable embodiment of a top sheet with a number of pressurised air pockets 216. Each pocket comprises a cavity 215 and a restrictor 213. The restrictor inlet connects the pocket to the third stage chamber, as explained above. For most efficient operation, the surfaces of the cavity 215 and the restrictor 213 are preferably hydrophobic. The surface tension of water then acts to keep the pressurised pocket dry. The area of the restrictor 213 should preferably be less than one tenth that of the pocket 216. Using advanced manufacturing techniques, as explained later, restrictor areas as smaller than one ten thousandth that of the pocket area are produced. This greatly reduces the air consumption in the operation of this invention. Such advanced designs also reduce the need for active air pressure control.

In use, the inlet of each air pocket is supplied with compressed air via an air supply system. This air pressure combines with the capillary force from the hydrophobic surface, to expel the water from the pocket. The air pocket's characteristic of expelling any water that wets is what keeps the pocket dry. Once the pocket has been cleared of water, air flows from the third stage chamber through the pocket. The restrictor limits the volume flow rate through the pocket. Some air bubbles are produced at the air/water interface, but these do not compromise the stability of the ship and do not consume large amounts of energy. In its steady state the air pocket operates in this way. The pocket is filled with air, rather than water, and no viscous drag occurs at the pocket surface. The air pocket as described above will hereinafter be referred to as a 'pressurised air pocket'.

As explained earlier, because the viscosity of air is about one thousand times smaller than that of water, the viscous drag over an air-filled pressurised air pocket is effectively eliminated. When multiple pressurised air pockets are on the hull's submerged surface, viscous drag is effectively eliminated on each of them. When multiple air pockets are packed together closely, viscous drag is greatly reduced over the area that they cover. This invention discloses that by covering substantially all of the submerged area of the hull in pressurised air pockets, the overall viscous drag on the hull can be greatly reduced.

As explained above, in a preferred embodiment of the invention the radius of the pressurised air pocket is not be greater than twice the capillary length, to prevent the air water interface within the pocket breaking up and bubbles forming within the pocket and emerging from it. In the case of water, the pocket radius is ideally less than 5.4 mm. In practice, pocket radii of less than 1 mm are highly effective and are economic to produce.

Figure 3A:
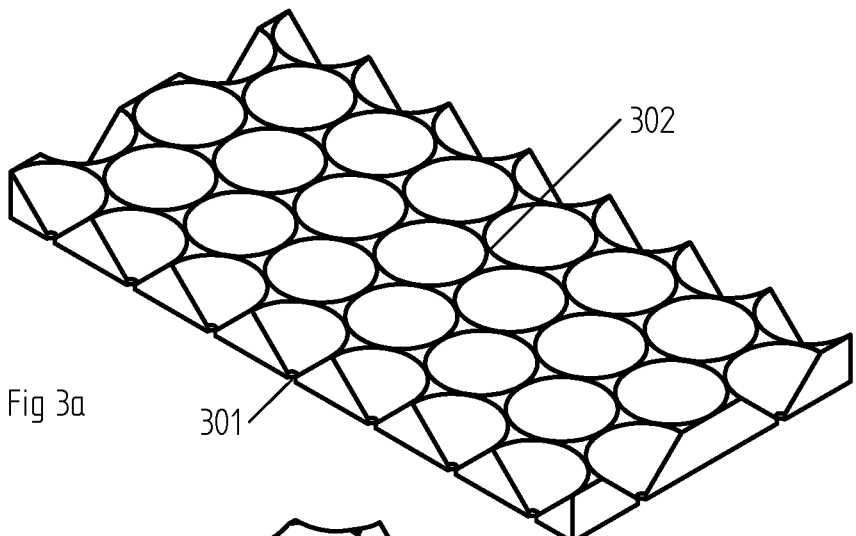
FIG. 3a illustrates one embodiment of cladding of the present invention with densely packed pressurisable air pockets where each air pocket adjoins nearby pockets.
Figure 3B:
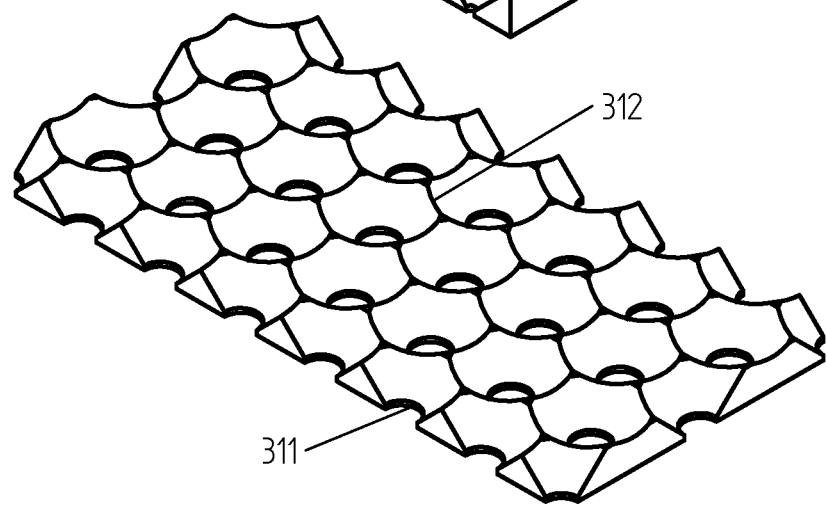
FIG. 3b illustrates an embodiment of the cladding of the present invention where each pressurisable air pocket overlaps nearby pockets.
Figure 3C:
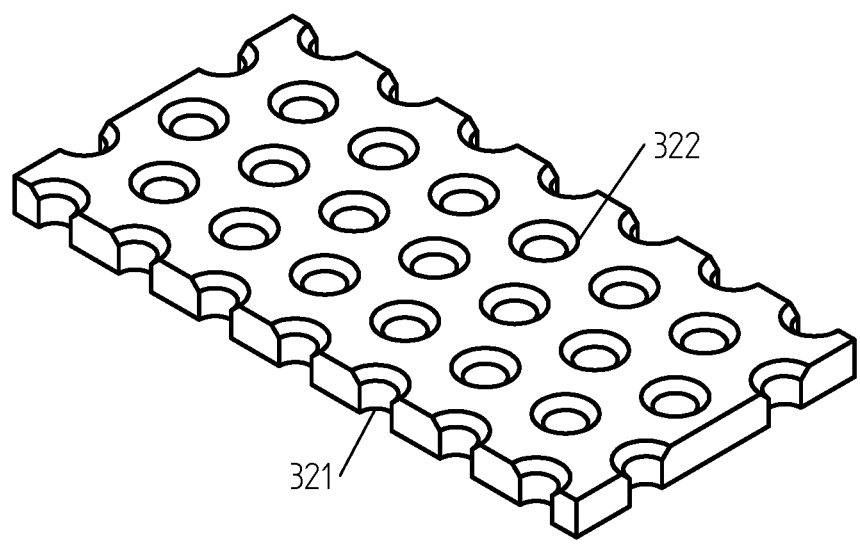
FIG. 3c illustrates one embodiment of the present invention where each pressurisable air pocket is in close proximity to nearby pockets.

The cladding of the present invention comprises a multitude of pressurisable air pockets, where the solid/water interface in each pocket is replaced with an air/water interface when the air in the pocket is pressurised. They may be closely-packed on the surface of a hull, as shown in the embodiment of FIG. 3a, where the rims of each pocket 302 abuts the rims of the adjoining pocket. The greater the percentage of the hull surface area they cover, the greater is the reduction in the wetted area of the hull. This in turn leads to a greater reduction in viscous drag. FIG. 3b shows an embodiment where the pressurised air pockets 312 overlap each other. FIG. 3c shows an embodiment where the pressurised air pockets 322 are a short distance from each other.

Geometrically, adjoining pressurised air pockets arranged as shown in FIG. 3a cover over 90% of the outer surface, with a corresponding reduction in the wetted area. The geometric design of the pressurisable air pocket thus gives the desired effects of both a larger outer surface area 302 and a lower inlet area 311 than a simple through hole. A useful indicator for assessing tool design is the percentage of the hull area that is covered by pressurised air pockets. Hereinafter, this shall be referred to as the 'pocket coverage percentage'.

The thermal transfer coefficient from a solid to air to water is far less than that from solid directly to water. Thus, the low viscous drag cladding described herein has an additional benefit of reducing the heat loss from the ship into the sea. The property of thermal insulation is particularly beneficial to ships traversing in low temperature seas, or pumping oil in low temperature climates.

The above embodiments of cladding are comprised of just three sheets. Those skilled in the art will recognise that a corrugated sheet metal design has higher strength and rigidity than single plates of the same mass. It may be desirable to design a ship so the cladding of the invention described herein is integrated into the structure of the ship, and forms a significant part of the ship's strength and rigidity. Additional sheets can be used in that process if desired.

Figure 10:
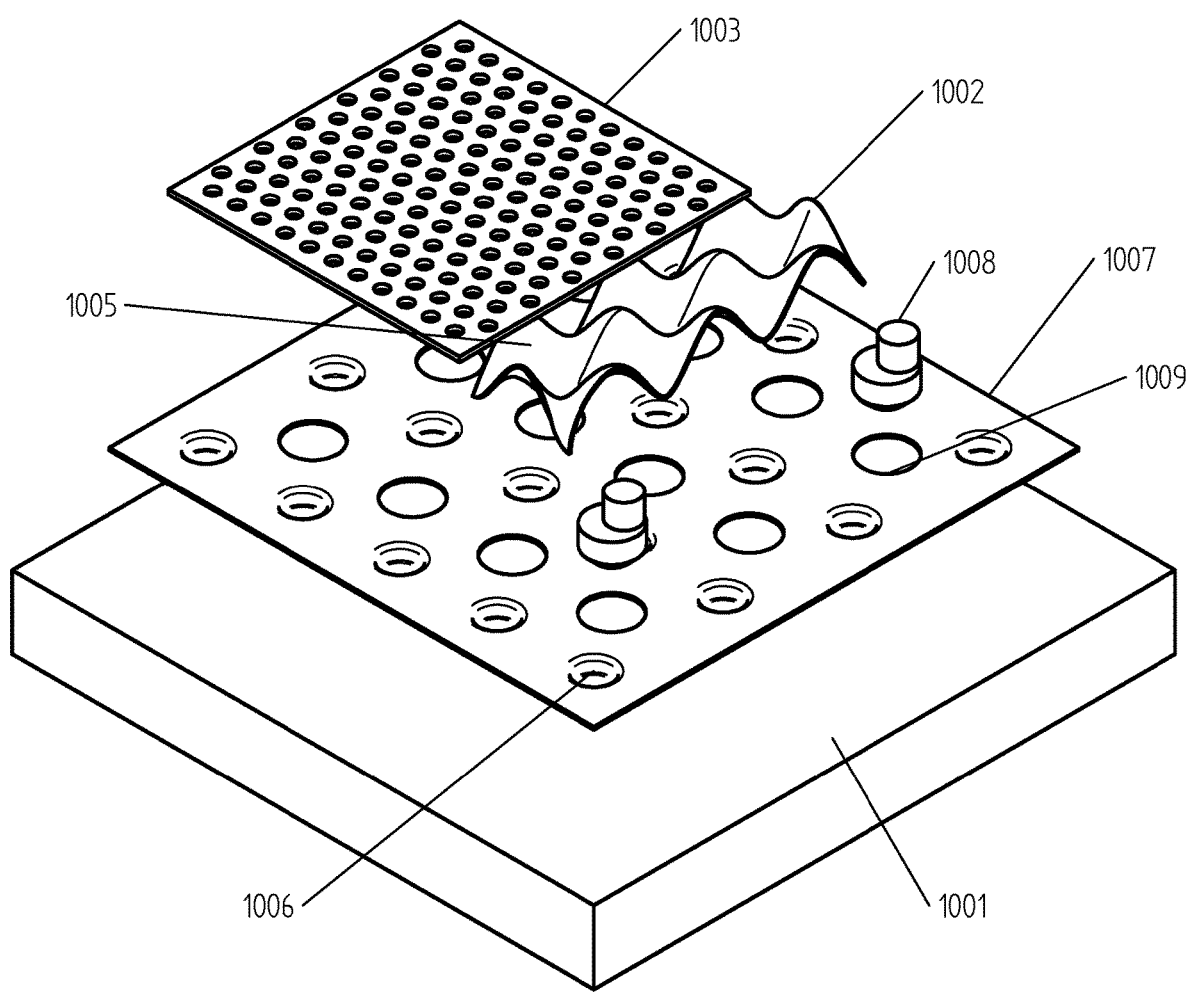
FIG. 10 illustrates an embodiment of a cladding in accordance with one embodiment of the present invention in the shape of a wave to which a top sheet (outer surface) is attached to form a panel.

An alternative embodiment of cladding is illustrated in FIG. 10. The top sheet 1003 is bonded to a wave-form sheet 1002 to form a single panel. The sides of the wave sheet are sealed by welding side sheets to the top and wave sheets. The side sheets are preferably integral with the wave sheet, but could also be separate. A single plenum 1005 is thus formed between the top sheet 1003 and the wave sheet 1002. A mounting sheet 1007 comprises receiver holes 1009 and welding dimples 1006. The mounting sheet is welded to the hull 1001 at the dimples. The dimples act to locate the mounting sheet proud of the hull surface. This provides space for the mounting lugs to locate and lock, and also provides a cavity for a noise dampening and rust inhibiting filler. Mounting lugs 1008 are bonded to the wave sheet so as to align with receiving holes on the mounting sheet 1007. The sealed bonded panel comprising the top sheet, wave sheet and mounting lugs are then aligned to the mounting sheet 1007, where the lugs 1008 fit into receivers 1009 on the mounting sheet 1007 and mechanically lock in place. The panel may be further secured by welding closure tabs on the panel to the mounting sheet.

The cavity formed between the panel and the mounting sheet is contiguous with the cavity formed between the mounting sheet and the hull. It is backfilled with polyisobutylene or other similar viscoelastic material. The polyisobutylene rubber is poured or injected into place, and preferably forms a viscoelastic solid or liquid. The rubber dampens the noise emanating from the ship and prevents noise pollution of the marine environment. It further protects the steel hull from rust, and forms an adhesive bond between the panel and the hull. This panel 1001 comprising a wave sheet design is particularly suited to cases where the air flow rate through the panel is low, as is the case when the top sheet comprises a sandwich design with restrictors which are orders of magnitude smaller in cross-sectional area than the pressurised pockets. In this case, the pressure in the plenum is substantially uniform, and the single stage plenum is successful at providing a substantially even flow of air across all restrictors in a single panel.

Many uses of the present invention will require the production of sheets with a very large number of holes. It is worth noting that at a hole spacing of 2.5 mm, approximately 200,000 holes are required per square meter. A single large tanker with a submerged area of 25,000 square meters requires approximately 5,000,000,000 holes. Production methods such as mechanical drilling, laser, water jet, and electron-beam machining are suitable processes for producing the small holes required in the top profile sheet, and can be suitable for laboratory-scale or small-scale production. However, when using currently available machines, the above mentioned processes all produce a single hole at a time and are not capable of producing the high volumes required for the industrial application of this invention.

A further difficulty in manufacturing the cladding described herein is that each hole preferably has a diameter that is much smaller than the sheet thickness. There are no known methods of producing such holes to the dimensions and in the volumes that are required. Methods and designs that solve these problems have now been invented and are hereby disclosed.

The panels described herein may be manufactured by means of standard sheet metal processes. Producing perforated sheet metal by means of punching holes using large pressing dies in a press is a standard operation known to those skilled in the art. This process is also known as stamping. Very fine holes can be produced in large volumes by this process. For example, stainless steel sheets 0.4 mm thick with holes of 0.5 mm at spacings of 1 mm or thereabouts are commercially available as standard items. Such sheets are commonly made in sizes of 2 m long by 1 m wide. Reel to reel production is also possible, as known to those skilled in the art. Typically, a punching die punches up to a thousand holes per cycle, and operates at up to ten cycles per second. The process is capable of producing large volumes of fine holes. It is however limited in that the hole diameter cannot be smaller than the sheet thickness. Thus punching is capable of producing the required volume of holes, but is not capable of producing holes to the required restrictor ratio.

One other useful process is that of chemical etching. Large scale photoetching processes are commonly used to produce articles in sheet metals, including stainless steel and aluminium. The photolithographic process is used to produce articles with fine details and resolutions of 0.1 mm or less. A single sheet undergoes the same processes, requiring substantially the same production time and inputs, regardless of the number or size of holes to be etched. Therefore, this process produces a million fine holes per square meter in the same time and for roughly the same cost as it produces a single hole per square meter. Photoetching tends to be a more expensive process than punching, and is not suitable for producing holes in thicker sheets. Electroforming is a process of forming sheets by depositing metal, particularly nickel, on a mandrel using a photolithographic process. It shares many of the characteristics of photoetching. Hereinafter, the term 'photoetching' shall include the process of 'electroforming'. Hereinafter, sheet metal with holes produced by mean of photoetching, electroforming or punching shall be referred to as having been produced by conventional means.

Current perforating technology in both stamping and photoetching of sheet metal limits the minimum hole diameter to about the material thickness. In particular, there are no known methods of mass producing closely-packed profiled holes in thin metal sheet that comprise a narrow restricting orifice on one side, and a larger outlet on the other, where the total outlet area covers a large proportion of the sheet surface. To date, there are no known methods of producing the profiled holes required by this invention. However, three separate methods, each with particular application advantages, have been invented and are now disclosed below.

Figure 2D:
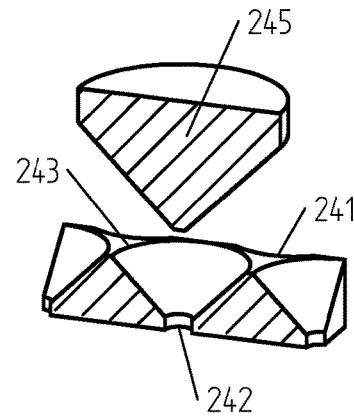
FIG. 2d illustrates a cross-sectional view of a hole in a sheet at an intermediate stage of production of the cladding of FIG. 2a or 2b along with a die used to form said hole, in accordance with one embodiment of the present invention.

The first favoured method is illustrated in FIG. 2a and intermediate steps are illustrated in FIG. 2c and FIG. 2d. In a first step, straight sided holes 230 are punched in the steel sheet, and a perforated steel sheet 231 is produced as shown in FIG. 2c. The upper diameter 233 is substantially the same as the lower diameter 232. Subsequently, the holes on sheet 241 are stamped with a forming die 245 that produces a chamfered shape on each hole. The die forming process substantially increases the pressurised air pocket diameter 243 as illustrated in FIG. 2d. It also reduces the restrictor diameter 242. The enlarged diameter 243 forms a closely packed pocket with a high pocket coverage percentage. The sheet thickness is also increased. The sheet is then coated to further reduce the diameter of the restrictor aperture. Electrolessly deposited nickel is the favoured coating as the thickness of the coating is highly uniform and capable of being controlled to tolerances of a few microns. A coating thickness of up to 100 microns is preferred. This produces a highly uniform restrictor size, which is significantly smaller than the sheet thickness. Referring now to FIG. 2a, a PTFE tape 212 is then applied to the top surface of the sheet 211 and then pressed into the pockets. It plastically deforms to the shape of the cavity 215 and adheres to the sheet metal. The PTFE tape is then perforated, using a die with a multitude of small diameter needles inset into it in a process known as needle perforation. Needle perforation is a known process commonly used in the plastics industry. According to this method, high restrictor ratios and high pocket coverage percentages are produced. This PTFE tape renders the sheet hydrophobic. It is also non-fouling.

Figure 9:
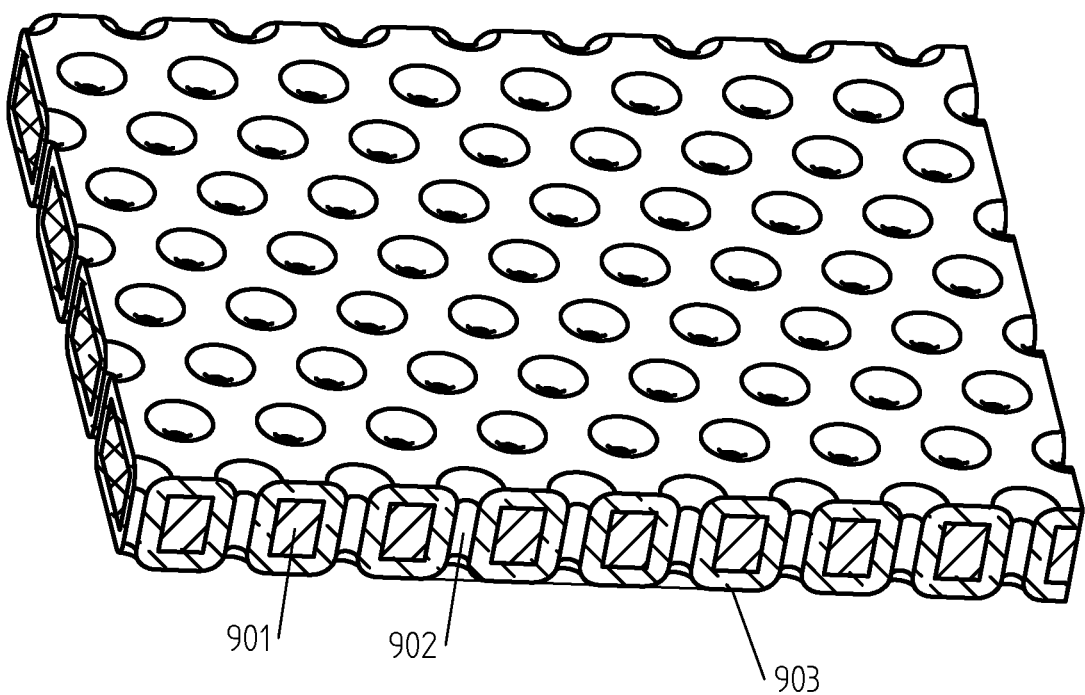
FIG. 9 illustrates an embodiment of a sheet in accordance with one embodiment of the present invention comprising thru holes where a coating has been applied and has reduced the diameters of the holes and increased the thickness of the sheet.

Applying the electroless nickel coating significantly improves the restrictor aspect ratio, as can be seen in FIG. 9. It shows a cross section of a metal sheet 901, with holes 902 punched in it that have an aspect ratio of 1:1. The sample sheet represented has a thickness of 300 microns, and the holes are 300 micron in diameter. A 100 micron thick precision electroless nickel coating 903 is then applied. The thickness of the coated metal increases to 500 microns, and the diameter decrease to 100 microns. Steel products coated in this way are suitable for heat treatment to form hard, tough and chemically stable alloys suitable for use in a marine environment. Thus the hole aspect ratio has increased from 1:1 to 5:1 through the disclosed coating. This process has a wide range of applications in industry outside of the invented cladding.

The second favoured method of producing restrictors to a small and tightly controlled dimension is to produce the top sheet by combining two or more separate sheets, as shown in FIG. 2b. The thicker sheets 222 and 223 are manufactured by the punching processes described above. The thin sheet 221 is manufactured by a photoetching process and is typically less than about 0.3 mm thick. This reduced thickness allows a smaller diameter hole to be manufactured in it. The restrictors 228 with a diameter of about the same as the thickness of sheet 221 are etched to close tolerances. The three sheets 221, 222 and 223 are bonded together with their holes 226, 227 and 228 in alignment. A preferred coating of electroless nickel is then applied, and reduces the restrictor diameter to the desired size.

To render the combined sheet hydrophobic, an additional hydrophobic layer is deposited on top of the electrodeposited nickel layer. This hydrophobic layer preferably comprises a thin layer of nickel in which a PTFE phase is encapsulated during electroless deposition. Electroless nickel plating incorporating PTFE encapsulation is a known process which is widely available commercially. This method produces consistently-dimensioned restrictors, with high restrictor size ratios and high pocket coverage percentages.

Figure 11:
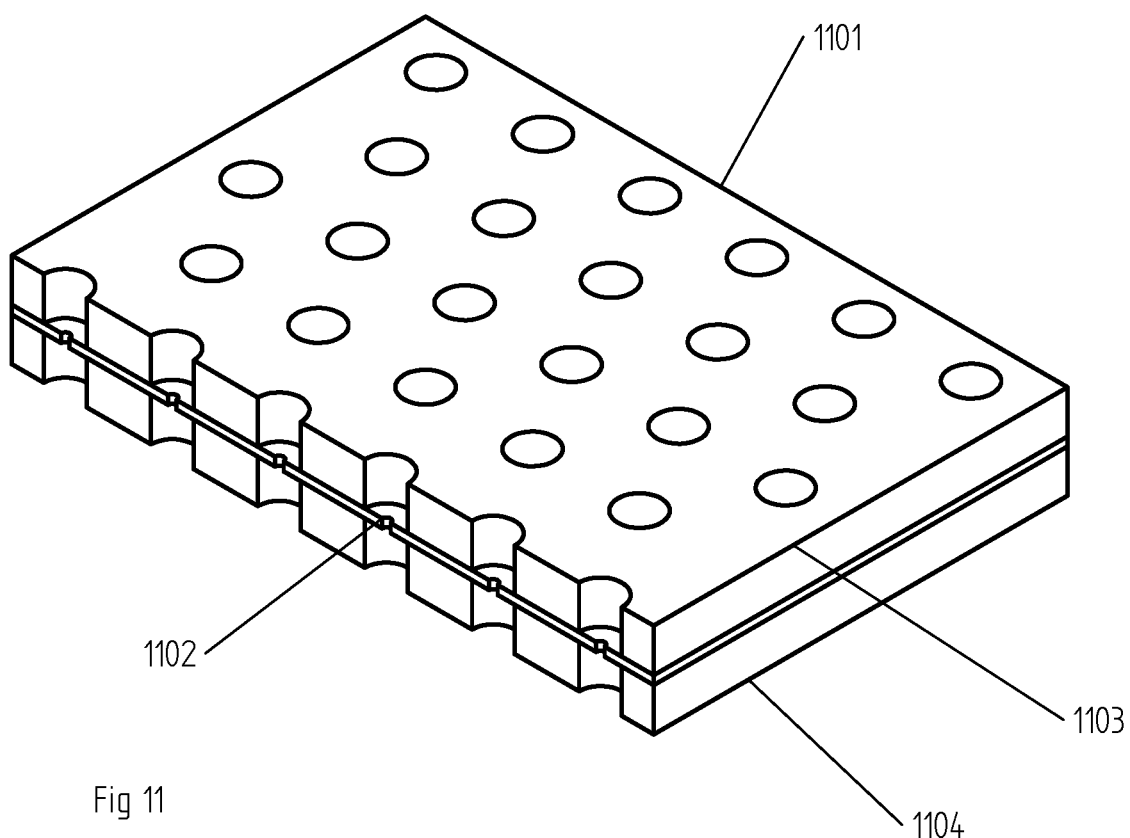
FIG. 11 illustrates an embodiment of a cladding in accordance with one embodiment of the present invention that has been made according to a sandwich construction.

An embodiment of cladding having very fine restrictor sizes is shown in FIG. 11 and is hereinafter referred to as a sandwich design. The top sheet 1101 comprises three sheets aligned and bonded to each other in a sandwich construction. A thin central sheet 1102 is bonded to two thicker sheets 1103 and 1104. The thickness of the central sheet 1102 is very low and this central sheet is therefore referred to as a foil. For the avoidance of confusion, it should be noted that many of the attached drawings are not to scale. It is not possible to represent 10 micron diameter holes in a section of a sheet that is 10 millimetres or greater in width. The thickness of the foil typically lies in the range from about 25 to about 200 microns. The low thickness of the foil enables the machining of very small diameter restrictor holes by advanced manufacturing processes at economic production rates. Using multiple laser drilling heads in parallel, laser drilling of such holes can be accomplished economically with great accuracy and at very high production rates. The diameter of the restrictors may be further reduced by applying one or more coatings. The final coating is preferably a hydrophobic fluoropolymer coating. The thin foil is fragile and can be damaged in the course of manufacturing or in use. However, by sandwiching the foil between two thicker sheets, the foil is protected, and can be handled and used in normal sheet metal production and shipbuilding processes.

Those skilled in the art will readily recognise that the foil of this design substantially lies on what is referred to as the neutral axis of the top sheet 1101. This means that when the top sheet is bent during sheet metal operations, the fragile foil is not subject to compression or tensile forces that might cause it to rip. Instead, only bending forces act on the foil, and these do not damage the restrictor. The sandwich design disclosed above is robust and protects the delicate foil and restrictor from damage during sheet metal fabrication processes. This sandwich design further enables the economic production of panels with top sheets of thickness of one millimetre or more, but containing restrictors of diameter of less than ten microns. This small diameter restrictor helps to minimise the consumption of compressed air when this invention is in use. The sandwich design hereby disclosed is particularly suited to the cladding on ocean-going vessels that encounter rough seas.

The embodiment of FIG. 11 may be manufactured by replication. The replication process is widely used in the manufacture of the beds of machine tools, as well as other industrial products. This is a highly accurate method of producing a male form from a given female mould. The top sheet can be reproduced with high accuracy and repeatability by this method. The process is illustrated in FIGS. 5a, 5b, 5c & 5d. First, a grinding wheel 501, as shown in FIG. 5a, has the desired male profile machined into its outer surface by a diamond dresser. A mould surface 502 is then ground on a surface grinder in two orthogonal directions, to produce the mould surface topography. When ground in one direction, the grinding wheel profile 503 generates the mould profile 504. It is then ground in the orthogonal direction to generate the profile 505. The mould is then coated with a thin layer of releasing agent. The replicant, preferably comprising a room-temperature-vulcanising liquid silicone rubber, is then applied to the mould surface. A thin perforated sheet 512, of metal or composite, is first coated with a thin layer of primer. The hole pattern and dimensions of the sheet match the features on the mould. The sheet is then aligned with the mould and pressed against the wet replicant. This perforated sheet acts as a base and a stiffener for the replicant. The replicant is allowed to vulcanise, during which time it also forms an adhesive bond with the perforated sheet. When the replicant hardens, the sheet coated in the replicant is removed from the mould. The silicone rubber forms an advantageous hydrophobic surface. The tabs 511 protruding above the surface of the supporting metal sheet are cut away with a sharp blade to expose a through orifice. Fiberglass or carbon fiber cloths are usefully used instead of the perforated metal sheet, if preferred. The top sheet formed in this way is then bonded to an air distribution frame. This method is suitable for producing smaller objects and is favoured when producing doubly-curved surfaces.

The top surface of the panel is preferably treated to become hydrophobic. A favoured method is to apply a layer of Polytetrafluoroethylene (PTFE) in the form of a tape. As well as being hydrophobic, it has the advantage of being chemically inert, and therefore non-fouling of the sea environment. Its thickness is preferably less than the thickness of the top sheet. A PTFE tape is prepared by first skiving a thin PTFE layer that is thin enough that it to enable it to be rolled into a reel. The tape is then etched on one side only to remove the Fluorine ions on that side only. This renders it suitable to adhesion bonding on that side. A calendering or textiling operation is then performed, as detailed below, and then a thin layer of pressure sensitive silicone adhesive is applied to the etched surface. The adhesive tape produced by this method is pressed against a sheet metal surface and bonds securely to it. The bond formed is sufficient to last indefinitely underwater. When pressed into the air pockets of this invention, the PTFE plastically deforms and permanently conforms to the shape of the air pocket. Its hydrophobic properties are excellent. A perforation step then takes place where the restrictor apertures are formed using a die with multiple needles.

Figure 6:
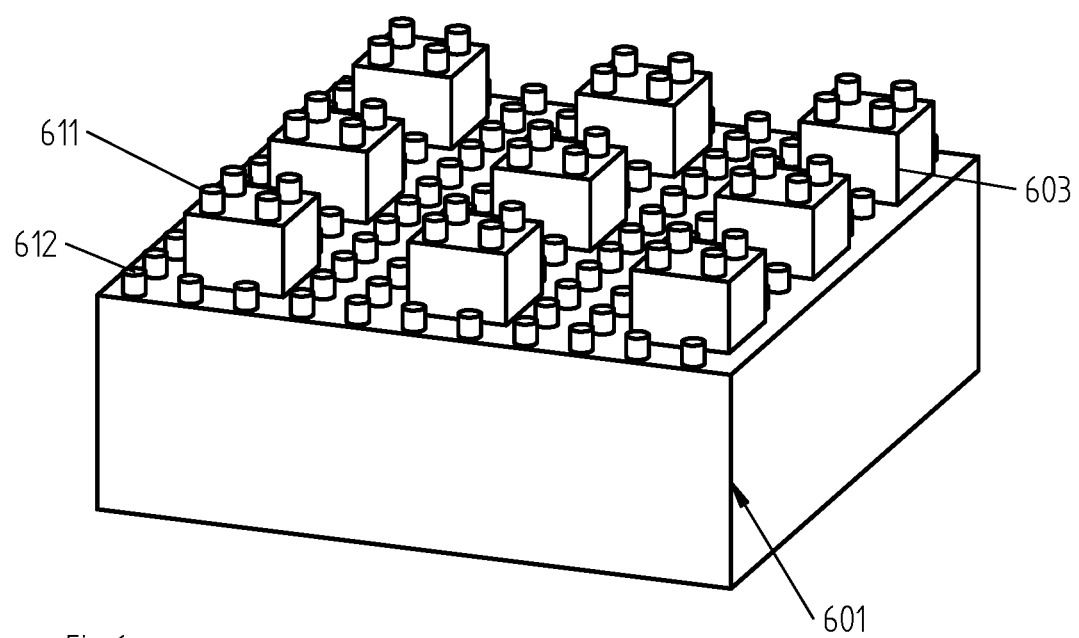
FIG. 6 illustrates an embodiment of PTFE tape suitable for use in the present invention that has undergone a calendering operation in accordance with one aspect of the present invention.

The preferred method of increasing the hydrophobicity of the PTFE layer is to use the known process of calendering. This is easily done using profiled rollers as was disclosed in U.S. Pat. No. 3,354,022. The profiles on the rollers are typically concave, and generate convex profiles on the PTFE tape. A dimensional hierarchy of two or more profiles is easily created using a profiled roller with hierarchical profiles. A simpler way is to process the tape twice using different roller surface topologies, starting with the smaller dimension profile, and proceeding to the larger dimension profile. FIG. 6 shows a section of PTFE tape 601 that has been calendered in this way. The smaller dimension features 611 and 612 are produced in the first calendering step. The larger features 603 are produced in the second calendering step. Applying a thin liquid layer to the calendering roller helps to ensure that the features 612 are not destroyed during the second calendering step. PTFE is easily processed in this way as it has low yield strength and a high percentage plastic deformation before failure. Calendering in this way increases the hydrophobicity of the PTFE and reduces the air pressure required to clear water from any pocket that is wetted.

Figure 7A:
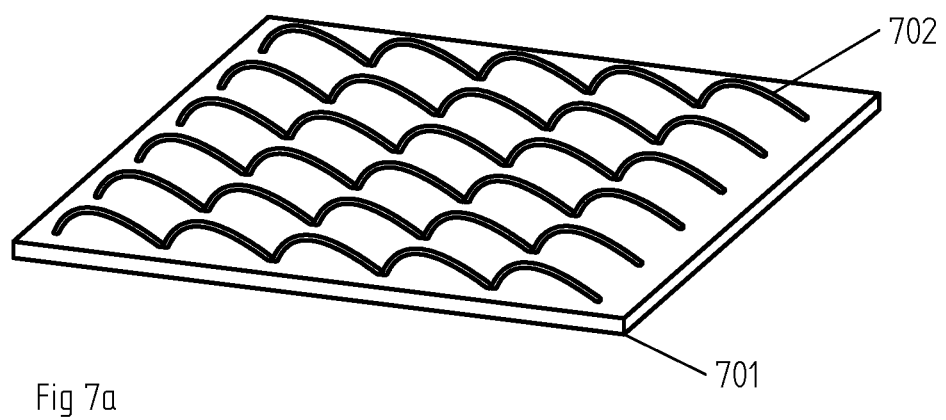
FIGS. 7a and 7b illustrate embodiments of PTFE tape that have undergone textiling operations and have suitable threads attached to the tape surface suitable for use in one or more embodiments of the present invention.

The stability of the air layer is increased by treating the PTFE tape to what is hereinafter called a 'textiling process'. This textiling process is where a hydrophobic thread is attached to the tape. The preferred thread is made of expanded Polytetrafluoroethylene known commonly as ePTFE. It is commonly used in a variety of textile processes. It is hydrophobic, high strength, and is widely available commercially. The thread diameter is chosen to be sufficiently small to enable its use in suitable textile processing machines. Referring to FIG. 7a the preferred method of attaching it is to stitch the thread into the tape 701 in such a way as to form closed loops 702. This is a known process in the textile industry.

The length of the loops should be of the same order of magnitude as the spacing between the pressurised air pockets. The stands may all be of the same size, though two or three separate lengths are also possible, thus giving a hierarchical dimensional structure.

Figure 7B:
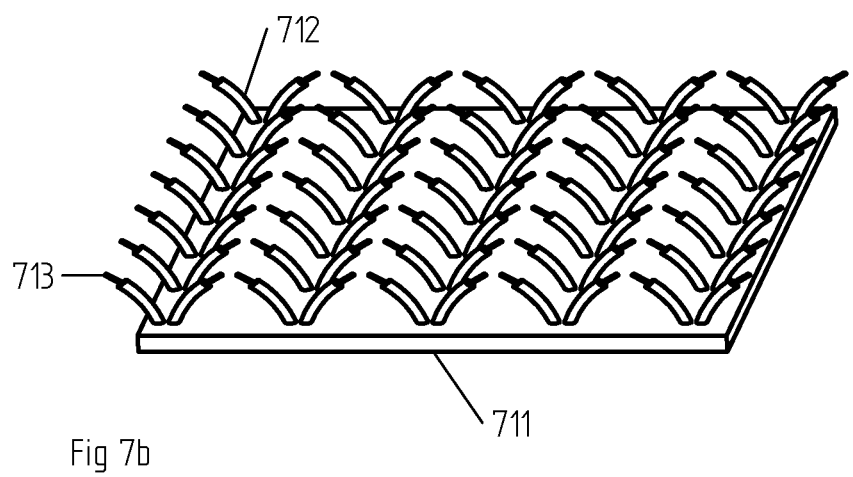

Referring to FIG. 7b the favoured thread to use is stainless steel wire coated in PTFE. This commercially available thread is commonly used in a variety of industries. The thread gauge is chosen so as to be flexible enough to be stitched on available machinery. This thread is first sewn as closed loops into the PTFE tape 711, in a similar manner to how loops 702 are formed, as described above. Individual strands are then formed by cutting a loop to form two individual strands. This is done by passing each loop between sharp blades as part of the stitching process. This is a known process in the textile industry. The cutting process exposes the hydrophilic inner core of stainless steel 713 at the tip of the thread only. The rest of the strand 712 remains hydrophobic. This thread gives a stable air/water interface in operation, as air bubble escape from the air interlayer into the water is suppressed by the water's attraction to the hydrophilic stainless steel. Air flow from the pressurised air pockets push water away from the hydrophobic thread, and the hull surface is left dry The two embodiments of tape in FIGS. 7a and 7b described here help to stabilise the air/water interface at a distance away from the hull surface.

Figure 12:
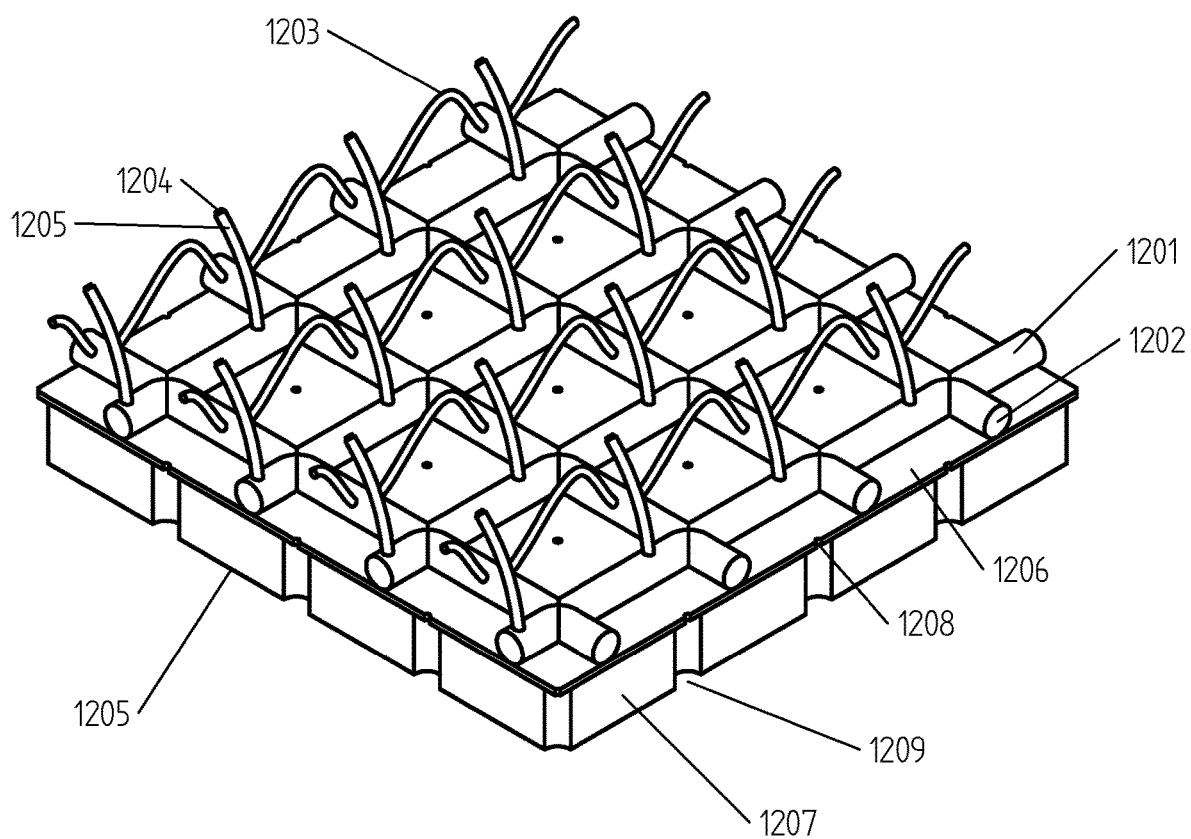
FIG. 12 illustrates an embodiment of a cladding in accordance with one embodiment of the present invention top sheet, comprising a fibrous open tape with hierarchical features, which is attached to a sheet comprising small air holes.

A further embodiment of a cladding topsheet/outer surface is illustrated in FIG. 12. It comprises a fibrous surface tape 1201 bonded to a perforated sheet assembly 1205 as described below. An open substrate 1202 is manufactured, preferably using glass fiber mesh coated in PFA This is a commercially available product. A hydrophobic fibrous layer 1203 is then bonded to it either by stitching or adhesion bonding. Preferred fibres are ePTFE, and glass cloth coated in PFA or PTFE. These are attached to the substrate and form closed loops as illustrated. Alternatively, ePTFE thread is used and the closed loops are cut producing open strands of hydrophobic fibers on the surface of the tape. A second fibrous layer comprising an inner hydrophilic core and an outer hydrophobic coating is bonded to the substrate 1202. First closed loops are formed, and then the closed loops are cut to expose the hydrophilic cores 1204 at the end of hydrophobic threads 1205. The fibrous tape thus produced comprises hierarchical structures comprising one or more layers of hydrophobic fibers and a single layer of hydrophobic fibers with an exposed hydrophilic core. The fibers with the exposed hydrophilic cores should be longer than the hydrophobic fibers. The tape is produced on machinery common in the carpet and other textile manufacturing industries.

A foil 1206 is bonded to a perforated metal sheet 1207 with perforated holes 1209. Thru holes 1208 are laser drilled in the foil surface, into the supporting layer beneath. The spacing of the holes should preferably be less than four times the capillary length of water. The diameter of the holes should be sufficiently small so as to limit air consumption. The open tape 1201 is bonded to the foil surface to produce a cladding topsheet. This topsheet is attached to simple struts on a ship hull. Polyisobutylene is used as a sealant. Compressed air is supplied to the cavity between the top sheet and the hull, and flows through the multitude of thru holes. The hydrophobic fibers remain un-wetted, and the hydrophilic tips 1204 of the fibers 1205 stabilise the air layer, by limiting the uncontrolled escape of air from the air layer. Those skilled in the art will recognise that the cladding of this design is analogous to an air bearing, where the thickness of the air layer reduces when subjected to an increased external pressure and increases when the external pressure reduces. When operating under stable conditions, the air largely escapes at the waterline only, as the hydrophilic cores prevent air from escaping from the rest of the air layer. The supporting perforated sheet layer 1207 can usefully be replaced by a porous layer with a high degree of open porosity. The thin foil layer of this embodiment is vulnerable to damage on large vessels. It may be useful for smaller vessels, and especially useful in pipes carrying liquids.

The design of the air flow system for an individual vessel is best optimized by applying known simulation software. Two favoured simulation software packages are ANSYS CFX and ANSYS Fluent. While the passive control through the optimum design of channels, chambers and orifices is part of this invention, it is envisaged that known instrumentation such as pressure and flow sensors and regulators, control valves, and the like may be used to optimize the operation of this invention, particularly in large installations. These are obvious elements of any air distribution system, and are not claimed as part of this invention.

Aspects of the present invention are directed to the prevention of fouling of marine structures such as ship hulls and other marine structures.

Fouling is the term used to describe the growth of organisms on ship hulls. Typically, the process commences on a bare structure where small microorganisms first attach to the surface. Over time these grow, and further larger organisms also attach to the surface. These can have a negative impact on the buoyancy, performance and even integrity of the structures. Fouling is particularly problematic for shipping as it can lead to a significant increase in the viscous drag on the vessel causing fuel consumption to increase. The shipping industry worldwide is a large global producer of greenhouse gases, so the increased fuel consumption due to fouling leads to a large increase in environmental as well as economic costs.

The current industry norm is to try to prevent fouling by coating the affected surfaces with anti-fouling paint. These however typically contain biocidal chemicals such as copper that are toxic to marine life. Indeed, it is their toxicity that renders them effective. They work through killing the organisms that consume them. However, because the toxic chemicals are consumed by organisms, the effectiveness of the paint surface diminishes over time. In order to maintain effectiveness, such paints are designed to wear away at a steady rate so as to continually expose fresh poisonous layer to resist fouling. This way, their toxic substances are spread throughout the oceans, killing organisms and polluting marine life. The implementation European Union legislation to ban the use of biocides in anti-fouling paint has been postponed because of the lack of a viable alternative to biocides as an anti-fouling agent. Implementing the ban would have resulted in an unacceptably large increase in the fuel use and greenhouse gas emissions by the shipping industry.

Therefore, there exists an urgent need to provide a method for protecting ship's hulls from fouling in an environmentally safe manner.

Accordingly, the invention further provides a method of treating the surface of a ship's hull that reduces fouling and does so in a non-polluting manner. The method comprises of preparing a thin PTFE tape, then treating one side of the tape to remove the Fluorine ions on that surface so that it suitable for adhesion bonding, then attaching said PTFE tape to the hull by means of adhesion bonding.

It is an object of the present invention to provide a method of treating ships' hulls so as to resist fouling without doing so in a manner that is toxic to the environment. Other objects and advantages of the present invention will become apparent from the following description. The method of applying an anti-fouling coating of this invention can be beneficially used in various applications such as the coating of ships' hulls, marine structures such as buoys, jetties, oil platforms, energy generation devices and the like.

This aspect of the invention applies to ships, submarines, marine structures such as buoys, jetties, oil platforms, energy generation devices and the like. Hereinafter, the term ship shall be used to describe all such vessels and structures. The term hull shall refer to any part of the outer surface of a ship, and includes hull structure, keel, rudder, bearing housings, propeller shafts, impellers and the like.

Polytetrafluoroethylene $(C_2F_4)n$, commonly known as PTFE, is a very low surface energy material. It consists of a long chain of carbon atoms, each one attached to two Fluorine atoms. It is inert and non-reactive to almost all chemicals. However, its low surface energy makes it difficult to bond to a ship's hull, which typically consists of steel, aluminium, carbon fiber or fiberglass. PTFE is also a good electrical insulator.

In this invention, PTFE sheet is first made into a thin sheet. The preferred method is where a large cylindrical block of PTFE is first produced. The roll is then mounted on a lathe and rotated about its central axis. A thin layer is machined off it in a known process called skiving. To be useful to this invention, the thin sheets so produced, should have dimensions of less than 1 mm in thickness, and be over 150 mm in width, and be over 1 m in length. The thin sheets so produced should be thin enough to be curled around itself into a roll, and hereinafter shall be referred to as 'tape'.

To enable the tape to be adhered to the hull surface, an activation process is carried out on one surface only as described as follows. This is preferably done by low-pressure hydrogen plasma etching. It is done in a vacuum chamber at pressure less than 1 Torr, and a temperature just above room temperature. The hydrogen in the low temperature plasma reacts with the fluorine atoms and liberates them from the PTFE surface in the form of HF gas. The HF gas is drawn away by the vacuum pump. Hydrogen ions also react with and bond to the unsaturated carbon atoms, thus forming a $CH_x$ polymer surface. This surface is suitable for adhesion bonding with many known adhesives. Silicone adhesives are one such group of suitable adhesives that are highly suited to the marine environment. The above surface treatment shall hereinafter be referred to as an activation step.

A less preferred activation method is to chemically etch the tape on one side using sodium ammonia in a known process. The process uses hazardous chemicals and carries high environmental risks, but is also included within the definition of an activation step.

The activated surface of the tape is then preferably coated with a thin layer of pressure sensitive silicone adhesive of about fifty microns thick. Hereinafter, this tape shall be referred to as 'adhesive-backed PTFE tape'. In certain cases, as when coating small concave surfaces, it may be convenient to apply the adhesive coating to the hull rather than the tape. The terms 'adhesive-backed PTFE tape' and hull shall apply in this case also.

The hull is prepared so that its surface can form a reliable bond with the adhesive-backed PTFE tape. In the case of a hull made of metal, the surface should preferably be grit blasted. Alternatively, if the material surface is in good condition, it may be abraded using fine sandpaper. Then it should be wiped clean with isopropyl alcohol, and then allowed to dry. The tape is then applied by rolling onto the surface. A roller is used to press the adhesive-backed PTFE tape firmly into the hull so that the adhesive makes intimate contact with the hull surface over substantially all its surface. The roller surface should preferably be hard and stiff, and preferably made of metal or ceramic, in order to accomplish this.

Where runs of tape overlap on the surface, they are trimmed into a lap joint by using a rolling blade to produce a joining where there is little or no silicone adhesive, and where the two adjoining runs of tape are in intimate contact.

Doubly curved surfaces are preferably covered are preferably covered by stretching the tape as it is applied. The roll of PTFE is applied to the hull surface at the centre of its width. The tape is then worked from the centre to the outside using a roller with a rubber or similarly compliant surface. The PTFE tape has the advantageous characteristic of enduring a large plastic deformation before failure. This enables it to stretch readily and conform to the doubly curved surface. Furthermore, while it is soft, it is also tougher than many plastics, and is very durable. Tests in the sea show no detectible wear of the tape thickness over a period of many months. The silicone adhesive also proved entirely suited to the marine conditions. The tape remains firmly bonded to the hull even on rotating parts such as the shaft and propeller blades. Wear on the leading edge of the propeller was observed, which was not unexpected.

Most importantly, tests in the sea also show that there is little or no growth of organisms on its surface. Thus, the adhesive-backed PTFE tape proved to be an effective anti-fouling covering, and is chemically inert so that it does not pollute the marine environment.

The present invention has further applicability to aerodynamic surfaces of moving objects.

The present invention has applicability to the reduction of drag and the control of the boundary layer on the surfaces of airplanes. It is also relevant to other vessels and objects that travel through air such as helicopters, unmanned aerial vehicles, gliders, rockets, missiles, and the like. It is also relevant to road and railway vehicles. It is also relevant to rotating objects such as helicopter and wind turbine blades. The land and air transport industries are large global consumers of fossil fuels and producers of greenhouse gases. Reducing fuel consumption due to viscous drag and controlling the boundary layer on aerodynamic surfaces will result in large reductions in environmental damage and large economic savings.

It has been known for many decades that controlling the boundary layer on an aerodynamic surface can reduce the overall drag acting on it. Blowing air into, or sucking air out of, the boundary layer can reduce the drag acting on the surface. The technique typically acts in one of two ways. A first effect is to delay the transition from laminar to turbulent flow. This reduces drag as the drag from a turbulent boundary layer is considerably higher than that from a laminar boundary layer. A second effect is to delay or avert entirely the onset of the separation of the boundary layer from the aerodynamic surface. This commonly occurs on the upper surface of aerofoils in the presence of adverse pressure gradients.

U.S. Pat. No. 5,803,410 discloses the use of round air holes on the surface of an aircraft wing. Both blowing and sucking of air through said holes is revealed to reduce drag. It discloses an aerodynamic surface where up to 23% of the surface comprises micro holes. U.S. Pat. No. 7,152,829 discloses the use of micro-slots of substantially rectangular shape, spaced at geometrically defined intervals that reduce aerodynamic drag. U.S. Pat. No. 8,783,624 discloses an aerodynamic body comprising a perforated skin communicating with inner corrugations which are oriented in a chord-wise direction, through which air is sucked. These inventions are of limited effectiveness, and are typically confined to the wing or tail sections of airplanes. In the case of rail travel, a highly elaborate system of creating a vacuum tunnel in which a passenger train would travel has been proposed as a means to avoid viscous drag. This has not yet been implemented as a solution.

Therefore there exists a need for a solution to the problem of viscous drag on aerodynamic Accordingly, there is further provided an aerodynamic surface for an aircraft comprising a multitude of small densely packed air pockets on its outer surface, and where the air inlet of each air pocket functions as a restrictor on the air flow to said pocket, and where the area of said restrictor is less than one half the area of the pocket's outlet, and where the inlet of each pocket is connected to an air distribution system, and where the air distribution system is connected to at least one pressurised air source.

The advantages of the invention are that the viscous drag on aircraft is reduced. When directed at rail vehicles, the invention reduces fuel consumption and enables the operation of high speed rail passenger and goods vehicles. Other objects of the invention are to increase the travel range of aircraft, rail and land vehicles for a given fuel load, and to reduce the size and cost of their propulsive equipment at a given design speed.

The viscous-drag-reducing property of this invention can be beneficially used in various applications such as aircraft wings and fuselages, helicopters, missiles, rotating machinery, rail and road vehicles, and the like.

This aspect of the invention is now described below. It is useful to first explain some of the terms that are used in the following description. The invention is described in terms of the viscous drag reduction on an aircraft travelling through a medium of air. However, the invention also relates to vessels and objects such as helicopters, unmanned aerial vehicles, gliders, rockets, missiles, and the like travelling though air. It also relates to engines and trains of carriages travelling along railways. It also relates to trucks and cars travelling by road. It also relates to rotating parts and machinery such as wind turbine and helicopter blades where the viscous drag on its attached boundary layers gives rise to undesirable viscous drag. Hereinafter, the term aircraft shall be used to describe any object whose surface is subject to relative movement with respect to a gas, and shall include airplanes, rockets, helicopters, unmanned aerial vehicles, gliders, rail vehicles, cars, trucks and other road vehicles. Hereinafter, the term air shall refer to the gas medium that exerts the viscous drag force on the aircraft. The term wing shall refer to the aerodynamic surface of that immediately adjoins the air medium, and includes all areas of an aircraft surface, including the fuselages and tail sections of airplanes, and all aerodynamic surfaces of road and rail vehicles. For clarity, the surface that adjoins the free stream is referred to as the outer surface.

In this invention, the gas pumped through the air pockets is referred hereinafter as air, but may be any suitable gas. The gas should be dried as necessary to ensure condensation does not form on any part of the air pumping system. It should also be filtered as necessary to ensure that any particulates that could block the restrictors are removed. The pressurised air may be supplied by a compressor, or from a storage tank. The compressed air may conveniently be gases from combustion or chemical reaction or from a phase transformation. Many aircraft comprise compressors or regions of high pressure air on their wing surfaces which may also be suitable sources of the compressed air of this invention.

While the invention is described in terms of sheet metal, non-metallic materials are also suitable, and sheets of such materials shall be referred to hereinafter as sheet metal. Epoxy-bonded carbon fiber is one such preferred material that is commonly used in aircraft manufacture. Thermoplastics such as polycarbonate may also be suitable, especially in the case of lower speed vehicles. Such named examples are not intended to be limiting in their scope.

Figure 13:
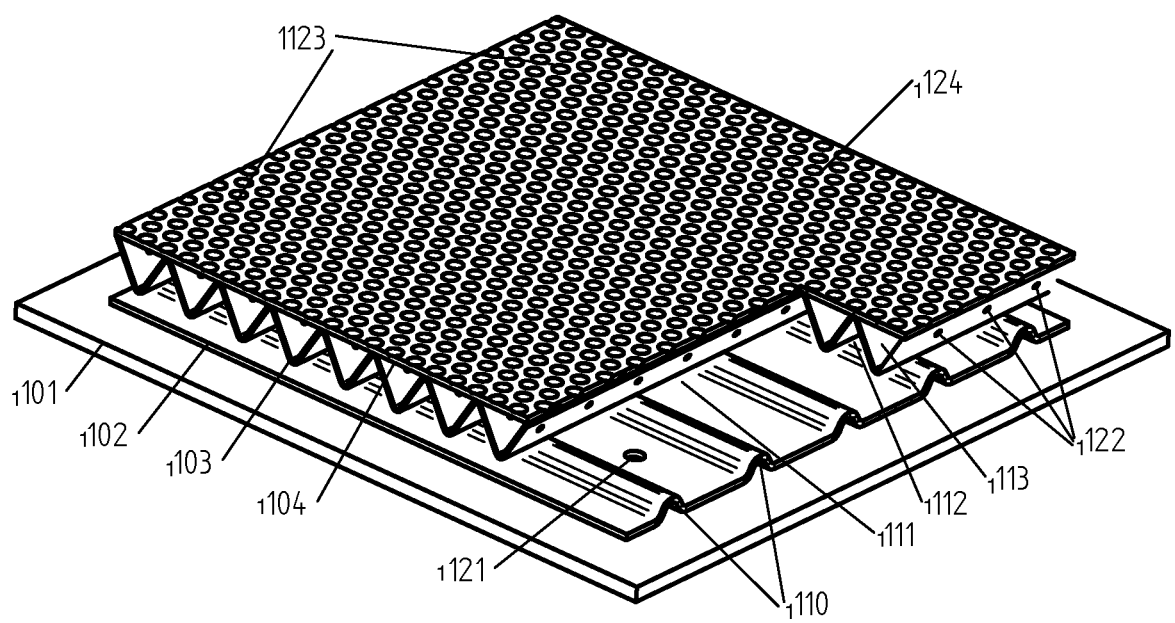
FIG. 13 illustrates an isometric view with a broken out section of an embodiment of a cladding or an assembly in accordance with the present invention.

The invention provides a boundary layer control system for an aircraft as shown in FIG. 13. It comprises a top sheet 1104 comprising a multitude of pressurised air pockets 1124. They are closely-packed on the surface of the aircraft, as shown on FIG. 15a, where the rims of each pocket 1302 abuts the rims of the adjoining pockets such they cover a large portion on the aircraft. FIG. 15b shows an example of where the pressurised air pockets 1322 are a short distance from each other.

Figure 15A:
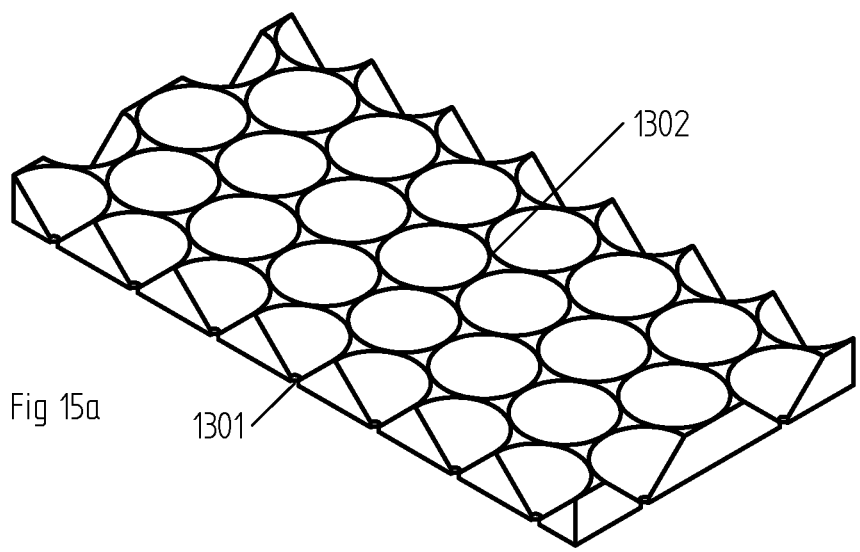
FIG. 15a illustrates one embodiment of cladding with densely packed pressurisable air pockets where each air pocket adjoins nearby pockets.
Figure 15B:
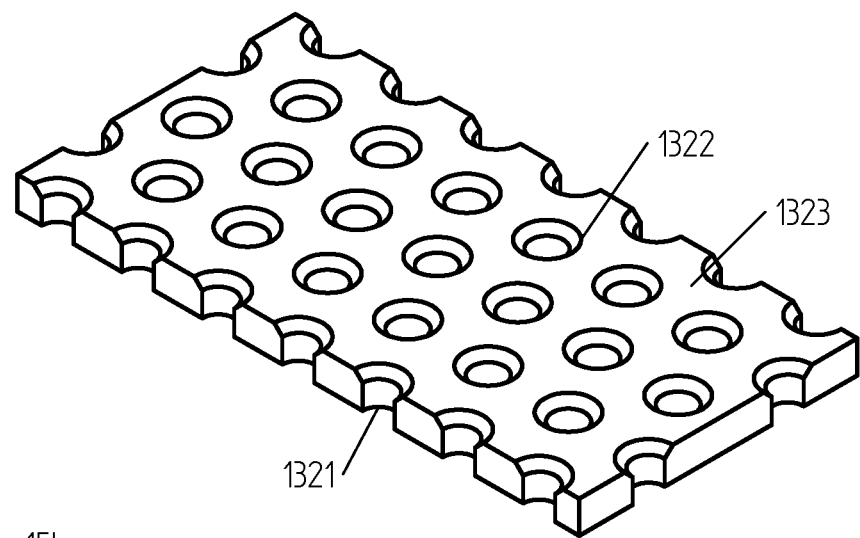
FIG. 15b illustrates an embodiment of cladding where each pressurisable air pocket is in close proximity to nearby pockets.

Geometrically, adjoining pressurised air pockets arranged as shown in FIG. 15a cover up to about 90% of the outer surface. The geometric design of the invented pressurised air pocket thus gives the desired effects of both a larger outer surface area 1302 and a smaller inlet area 1301 than a simple through hole 1230 of the prior art design shown on FIG. 14c. A useful indicator for assessing the effectiveness of the boundary layer control design is the percentage of the surface area that is covered by pressurised air pockets, both in a local area, and as a percentage of the overall aircraft.

The term 'substantially flat' shall mean a surface that is substantially parallel to the outer surface of the aircraft.

For convenience, this invention has been described below as a cladding comprised of just three sheets. Those skilled in the art will recognise that a corrugated sheet metal design has higher strength and rigidity than single plates of the same mass. It may be advantageous to integrate the cladding described herein into the structure of an aircraft such that it contributes to the strength and rigidity of said aircraft. Additional sheets can be used in that process if desired.

The viscous drag on an aerodynamic surface is proportional to the rate of change of velocity of the air adjoining its surface. This invention operates by reducing the velocity gradient on the surface of the aircraft, thereby reducing the drag it encounters. The size of the pressurised air pockets is designed to be small enough to substantially isolate each pocket from the free stream flow. The maximum size of pressurised pocket allowable depends on the thickness of the boundary layer and the nature of the airflow. The free stream flow may be either laminar or turbulent. The boundary layer thickness and the nature of the flow may change over aerodynamic surfaces. Generally, pocket sizes of less than 1 cm are preferred, and pocket sizes of less than about 1 mm are feasible to produce using the manufacturing techniques outlined later. The pockets cover up to about ninety percent of the wing surface. Because of its geometry, the pocket inlet acts as a restrictor, and may be referred to as such in this description. Within each pocket, low-velocity air flows from the pocket inlet to the pocket exit.

The air velocity is substantially lower than the free stream velocity. Consequently, the resulting velocity gradient on the surface of each pocket is substantially lower than would be the case on a flat surface adjacent to a free stream under the same flight conditions. Furthermore, the low-velocity air that emerges from the pockets passes over the lands 1303 shown in FIG. 15a. The velocity gradients on the wing surface in these areas, though higher than those obtaining in the pockets, are nonetheless substantially lower than those obtaining on a flat surface adjacent to a free stream under the same aerodynamic conditions, and the viscous drag is consequently reduced.

In effect, this invention operates to shelter the surfaces of the pockets from the viscous drag effects of the high speed free stream flow, and also operates to reduce the viscous drag effects of the lands that define the outer wing surface. The invented pockets can operate as either blow holes or suction holes. Sucking holes are disadvantageous in that sucking air carries the risk of sucking dirt or insects into the restrictors and blocking them.

Referring to FIGS. 14a, 14b and 14c, each figure represents a section of a top sheet, as explained below. In FIG. 14a, the operation of a restrictor may be understood by examining sheet 1211 which comprises a multitude of the invented pressurised air pockets 1210. The cross-sectional area of inlets 1212 of each pocket is less than that of outlet 1213. In particular, its operation can be favourably compared with an aperture 1230 shown in FIG. 14c which does not incorporate a restrictor, where inlets 1232 have substantially the same cross-sectional area as outlets 1233. Referring to FIG. 14a, for clarity, the area of the invented air pocket is defined as the cross-sectional area at its outlet 1212. The area of the restrictor is the cross sectional area of the restrictor at its narrowest section 1213. The functioning of a restrictor is important to the efficient operation of this invention, as is explained in the paragraphs that follow.

Referring to FIG. 14c, when air flows across the prior art unrestricted pressurised air hole 1230, as disclosed in U.S. Pat. No. 5,803,410 only a small pressure drop occurs, as is explained below. The air pressure in the chamber adjacent to the hole inlet 1232 is very close to that at the outlet 1233. For this invention to be effective a large percentage open area is required where the holes comprise as large a percentage of the area of sheet 1231 as possible. As the geometry of the holes 1230 are constrained by production limitations such that the holes' diameter is at least as large as the sheet thickness. The design goal of a large open area results in a minimal resistance to air flow across a thin top-sheet of this design. This results in a critical flaw where the air flow is substantially greater through those holes nearest the air inlet than those further away. This results in uneven airflow over the aircraft wing. Therefore, air holes made to the design of FIG. 14c are not suitable for this invention.

By contrast, FIGS. 14a and 14b, illustrate suitable embodiments of the invented air pockets which incorporate restriction on the air flow. When air flows from a plenum through the restrictor 1212 into the air cavity 1214 and escapes through its outlet 1213 a significant pressure drop occurs. The air supply system, the restrictor size, and overall pocket geometry are designed such that this pressure drop across the restrictor is substantially larger than the pressure drop along the plenum 1113 illustrated in FIG. 13. This ensures an even air flow across all restrictors that adjoin the plenum 1113, resulting in an optimum air flow across the wing surface.

Thus the inlet restrictor helps to produce a more even volume flow rate through each pocket, and acts to ensure an even air pressure in each plenum. The air pocket as described above will hereinafter be referred to as a 'pressurised air pocket'.

Prior to this invention, there was no obvious method of supplying air at the optimum pressure to the multitude of pressurised air pockets over the wide surface area of an aircraft surface. A suitable air distribution network has been invented, and is hereby disclosed.

Referring to FIG. 13, the top surface of the cladding comprises top sheet 1104, comprising a multitude of small closely-packed air pockets 1124. The area of each pocket's outer surface, which adjoins the free stream air, is more than twice that of its inlet, which adjoins the plenum 1113. Pressurised air is supplied to the inside of each air pocket, and ensures a steady flow of low speed air across the surface of the pocket and into the free stream air. The pressurised air is supplied by an air distribution system comprising formed sheet metal elements 1102 & 1103 that are assembled and attached to the aircraft surface 101 in such a way as to create air chambers 1112 & 1113 that are oriented in a substantially span-wise direction. For clarity, span-wise shall mean in the direction perpendicular to the air flow, and chord-wise shall mean parallel to the airflow. Air enters the assembly via the orifice 1121 and flows in a span-wise direction along chambers 1112. Air flows from chambers 1112 to the adjoining plenums 1113 via the perforations 1122. The locations and dimensions of holes 1122, and the height of ridges 1110, are adapted to ensure an optimum air flow from the air inlet through to each plenum. For instance, fewer holes, and holes of smaller diameter are preferable near the air inlet port 1121, then in the areas 1123 which are further away from the air supply inlet. The height and distance between ridges 1110 are reduced so as to restrict flow in the chord-wise direction when a greater chord-wise pressure gradient is required.

Those skilled in the art will recognise that sheet 1102 may be replaced by a series of batons mounted in the chord-wise direction, if convenient. The height and the spacing of the batons determine the pressure drop in the chord-wise direction, in the same way as the height of, and distance between ridges 1110 do when using a profiled sheet 1102. For the purposes of this invention, such a system of batons shall be referred to as a corrugated sheet oriented in the chord-wise direction.

This simple, low profile system distributes the air throughout the external surface of the aircraft. A highly satisfactory air distribution network, comprising simple materials and constructed using methods common in the aircraft, rail and auto industries has thus been invented and disclosed.

This invention requires the production of sheets with a very large number of holes. It is worth noting that at a hole spacing of 1 mm, approximately 1 million holes are required per square meter. A single large aircraft with a surface area of 5,000 square meters requires approximately 5,000,000,000 holes at such spacing. Production methods such as mechanical drilling, laser, water jet, and electron-beam machining are suitable processes for producing the small holes required in the top profile sheet, and can be suitable for laboratory-scale or small-scale production. However, when using currently available machines, the above mentioned processes all produce a single hole at a time and are not currently capable of producing the high volumes required for the industrial application of this invention.

A further difficulty in manufacturing this invention is that many embodiments of this invention require that each hole has an inlet diameter that is smaller than the sheet thickness. There are no known or obvious methods of producing such holes to the dimensions and in the volumes that are required. Methods and designs that solve these problems have now been invented and are hereby disclosed.

Panels are optimally manufactured by means of standard sheet metal processes. Producing perforated sheet metal by means of punching holes using large pressing dies in a press is a standard operation known to those skilled in the art. This process is also known as stamping. Very fine holes can be produced in large volumes by this process. For example, stainless steel sheets 0.4 mm thick with holes of 0.5 mm at spacings of 1 mm or thereabouts are commercially available as standard items. Such sheets are commonly made in sizes of 2 m long by 1 m wide. Reel to reel production is also possible, as known to those skilled in the art. Typically, a punching die punches up to a thousand holes per cycle, and operates at up to ten cycles per second. The process is capable of producing large volumes of fine holes. It is however limited in that the hole diameter cannot be smaller than the sheet thickness. Thus punching is capable of producing holes to the required volume, but is not capable of producing holes to the required restrictor ratio.

One other useful process is that of chemical etching. Large scale photoetching processes are commonly used to produce articles in sheet metals, including stainless steel and aluminium. The photolithographic process is used to produce articles with fine details and resolutions of 0.1 mm or less. A single sheet undergoes the same processes, requiring substantially the same production time and inputs, regardless of the number or size of holes to be etched. Therefore, this process produces a million fine holes per square meter in the same time and for roughly the same cost as it produces a single hole per square meter. Photoetching tends to be a more expensive process than punching, and is not suitable for producing holes in thicker sheets. Electroforming is a process of forming sheets by depositing metal, particularly nickel, on a mandrel using a photolithographic process. It shares many of the characteristics of photoetching. Hereinafter, the term 'photoetching' shall include the process of 'electroforming'. Hereinafter, sheet metal with holes produced by means of photoetching, electroforming or punching shall be referred to as having been produced by conventional means. Materials of low density, such as aluminium alloys and carbon fiber composites, are favoured in the aircraft industry, and materials in nickel or steel are usually unsuitable. However, they are entirely suitable for road and rail vehicles and other aerodynamic surfaces.

Current perforating technology in both stamping and photoetching of sheet metal limits the minimum hole diameter to about the material thickness. In particular, there are no known methods of mass producing closely-packed profiled holes in thin metal sheet that comprise a narrow restricting orifice on one side, and a larger outlet on the other, where the total outlet area covers a large proportion of the sheet surface. To date, there are no known methods of producing the profiled holes required by this invention. However, three separate methods, each with particular application advantages, have been invented and are now disclosed below.

The first favoured method is illustrated in FIG. 14*a* and intermediate steps are illustrated in FIG. 14*c* and FIG. 14*d*. In a first step, straight sided holes 1230 are punched in the steel sheet, and a perforated steel sheet 1231 is produced as shown in the drawing FIG. 14*c* of a prior art sheet. The upper diameter 1233 is substantially the same as the lower diameter 1232. Subsequently, the holes on sheet 1241 are stamped with a forming die 1245 that produces a chamfered shape on each hole. The die forming process substantially increases the pressurised air pocket diameter 1243 as illustrated in FIG. 14*d*. It also reduces the restrictor diameter 1242. The enlarged diameter 1243 forms a closely-packed pocket with a high pocket coverage percentage. The sheet thickness is also increased. The sheet is then optionally coated to further reduce the diameter of the restrictor aperture. Electrolessly deposited nickel is the favoured coating on steel as the thickness of the coating is highly uniform and capable of being controlled to tolerances of a few microns. A coating thickness of up to 100 microns is preferred. This produces a highly uniform restrictor size, which is significantly smaller than the sheet thickness.

The second favoured method of producing restrictors to a small and tightly controlled dimension is to produce the top sheet by combining two or more separate sheets, as shown in FIG. 14*b*. The thicker sheet 1223 is manufactured by the punching processes described above. The thin sheet 1221 is manufactured by either a punching or photoetching process and is typically less than about 0.3 mm thick. This reduced thickness allows a smaller diameter hole to be manufactured in it. The restrictors 1228 with a diameter of about the same as the thickness of sheet 1221 are produced to close tolerances. The two sheets 1221 and 1223 are bonded together with their holes 1226 and 1228 in alignment.

The third favoured method employs the known method of replication. This is a highly accurate method of producing a male form from a given female mould. The top sheet can be reproduced with high accuracy and repeatability by this method. The process is the same as that illustrated in FIGS. 5*a*, 5*b*, 5*c* & 5*d*. First, a grinding wheel with a cross-section 501, as in FIG. 5*a*, has the desired male profile 503 machined into its outer surface by a diamond dresser. A mould 502 is then ground on a surface grinder in two orthogonal directions, to produce the mould surface topography. When ground in the first direction, the grinding wheel profile 503 generates the mould profile 504. When ground in the second orthogonal direction it generates the profile 505. The mould is then coated with a thin layer of releasing agent. The replicant, preferably comprising an epoxy, is then applied to the mould surface. A carbon fiber cloth 512, is then pressed against the wet replicant. Multiple layers can be applied as necessary. Heat and vacuum are normally applied, as known to those skilled in the art. The epoxy replicant hardens, and the stiff carbon fiber sheet is formed and then removed from the mould. The tabs 511 protruding above the surface of the supporting metal sheet are machined away to expose through orifices. The top sheet formed in this way is then bonded to an air distribution frame. This method is suitable for producing aircraft wing surfaces where materials with a high strength to weight and stiffness to weight ratio are required.

Figure 17:
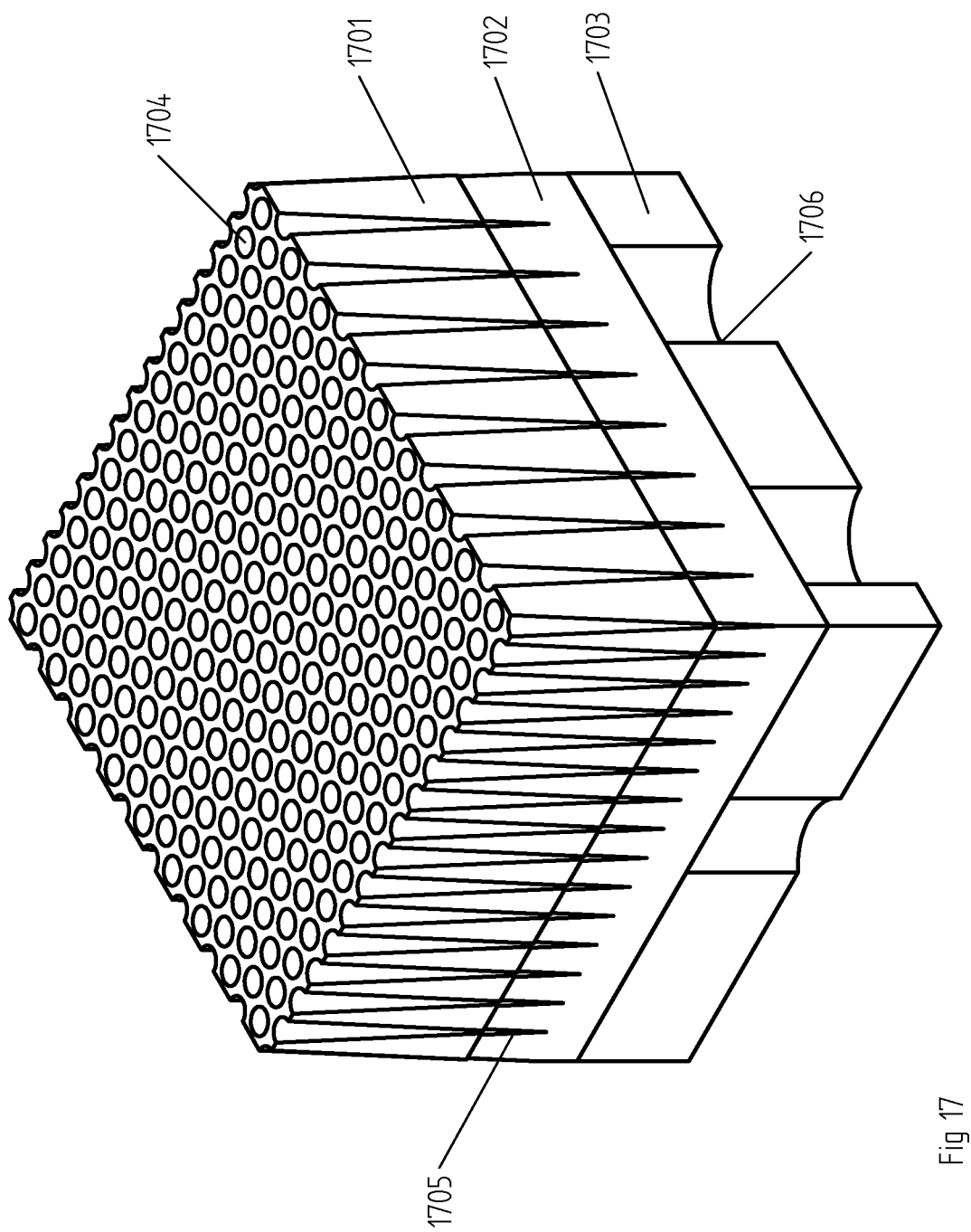
FIG. 17 illustrates an isometric view of a section of one embodiment of cladding where the top sheet comprising densely packed pressurisable air pockets is bonded to an intermediate porous layer which is bonded to a perforated sheet.

A fourth method that has been developed can be readily understood with reference to the embodiment illustrated in FIG. 17. A thermoplastic sheet 1701 is first bonded to a porous thermoplastic sheet 1702. The two thermoplastic sheets are then heated and then vacuum moulded onto a steel die. The male die comprises long thin needles, that are bonded together to form a single die. The needles are precision ground on their diameter, and on their tapers. Such needles are commonly produced to high specifications, and at reasonable cost. The needles are optionally coated and lubricated to prevent sticking of the thermoplastic to the die. A vacuum is drawn through the die, and the sheets are forced over the die and the needles penetrate the solid sheet completely and penetrate into the porous sheet. Thus, pockets 1704, in the solid sheet, and 1705 in the porous sheet are formed in the same process. The inlet diameter of pockets 1704 is thus manufactured to high precision. Once the pockets are formed, the vacuum is turned off, and a positive air pressure is then applied to release the formed sheet from the die. A final machining step may be applied to ensure a flat outer surface to the top sheet. This topsheet is mounted to a boundary control system, as shown in FIG. 13. Air flows through the perforations 1706, through the porous medium, and through each pocket inlet. An equal air pressure and air flow is thus provided to each air pocket. Because of the elongated geometry of the air pockets, the air flow emerging from each air pocket is substantially perpendicular to the wing surface. The air pockets cover a substantial portion of the wing surface. The geometry of the pockets is sufficiently small to ensure that turbulence does not occur within the pockets themselves, and the pockets are isolated from the flow field outside. This is determined by the air flow under design conditions. Under such conditions, drag on the aircraft is reduced.

Those skilled in the art will recognise that the topsheet disclosed in this invention is mechanically stronger and more robust than an equivalent topsheet with similar pocket coverage of the outer surface produced using simple thru holes. The increased strength of the invented design enables a higher proportion of the wing surface to be covered in air pockets.

The calculation of the pocket geometry and the design of the air flow system for an individual aircraft are best optimized by applying known simulation software. A favoured simulation software package is ANSYS CFX. It is particularly useful in identifying the optimum size of the compressed air pockets and the restrictors for their intended application. It is also useful for identifying the height of the ribs 1110 which largely governs the pressure gradient in the chord-wise direction. While the passive control through the optimum design of channels, chambers and orifices is part of this invention, it is envisaged that known instrumentation such as pressure and flow sensors and regulators, control valves, and the like may be used to optimize the operation of this invention, particularly in large installations. These are obvious elements of any air distribution system, and are not claimed as part of this invention.

It has thus been shown that the present invention provides a means to reduce the wetted area of a ship's hull, and thus reduce the viscous drag it encounters. It has further been shown that the present invention provides a means to prevent fouling of a ship's hull. It has further been shown that the present invention provides a boundary layer control system that reduces the viscous drag. While particular embodiments of the invention have been illustrated, they are not intended to be limiting. Modifications and changes may become apparent to those skilled in the art, and it is intended that the invention be limited only by the scope of the appended claims.

The invention claimed is:

1. A viscous drag reducing cladding comprising an outer surface with a plurality of air pockets therein, each air pocket having an air inlet and an outlet; wherein
the cross-sectional area of each air inlet is less than one tenth of the cross-sectional area of the air pocket's outlet, wherein the radius of each air pocket is less than twice the capillary length of water.

2. The viscous drag reducing cladding of claim 1, wherein each pocket is conical in shape.

3. The viscous drag reducing cladding of claim 1, wherein the plurality of air pockets are closely packed.

4. The viscous drag reducing cladding of claim 1, wherein the pocket outlets overlap.

5. The viscous drag reducing cladding of claim 1, wherein the outer surface of each air pocket comprises a hydrophobic material.

6. The viscous drag reducing cladding of claim 1, wherein its outer surface comprises a plurality of loops of hydrophobic thread where the loops are attached to said surface at both ends.

7. The viscous drag reducing cladding of claim 1, wherein its outer surface comprises strands of thread comprising of a hydrophilic core and a hydrophobic outer surface, and where one thread end is attached to the cladding outer surface and the other thread end is unattached.

8. The viscous drag reducing cladding of claim 1, further comprising an air distribution system, and at least two corrugated sheets, at least one of which comprises multiple perforations; wherein the sheets are arranged so that the ridges of the corrugated profiles of at least two sheets are substantially orthogonal to each other thereby creating at least two air chambers each in communication with each other via the perforations.

9. The viscous drag reducing cladding of claim 8, wherein the air distribution system comprises a wave-form sheet.

10. The viscous drag reducing cladding of claim 8, wherein the wave-form sheet is bonded to a top sheet to form a single panel.

11. The viscous drag reducing cladding of claim 1, wherein the outer surface comprises a fibrous surface tape bonded to a perforated sheet assembly.

12. An air distribution system for a cladding system on a ship comprising:
at least two corrugated sheets, at least one of which comprises multiple perforations; wherein the at least two sheets are arranged so that the ridges of the corrugated profiles of at least two sheets are substantially orthogonal to each other thereby creating at least two air chambers each in communication with each other via the perforations.

13. A tape for coating the hull of a ship comprising:
a hydrophobic backing film, comprising a front side and a back side, wherein
the back side of said tape is configured for adhesion bonding, and
strands of thread comprising two ends, whereby one end is attached to the front side of said hydrophobic backing film, and
wherein the other end is unattached, and
wherein the outer surface of the thread is hydrophobic, and
wherein the inner core comprises a hydrophilic material, and
wherein the hydrophilic core is exposed at the unattached ends of each strand.

14. A method of forming a metal sheet with conical holes comprising:
perforating a metal sheet with cylindrical holes;
stamping each cylindrical hole with a forming die having a conical base;
coating the inside of each hole to reduce the size of the hole at the tip of the cone;
applying a tape to the metal sheet and pressing the tape into the conical holes; and
perforating the tape to further reduce the size of the hole at the tip of the cone.

15. The viscous drag reducing cladding of claim 1, comprising elongated air pockets wherein air flow emerging from each air pocket is substantially perpendicular to the outer surface.

16. A viscous drag reducing cladding comprising an outer surface with a plurality of air pockets therein, each air pocket having an air inlet and an outlet; wherein the cross-sectional area of each air inlet is smaller than the cross-sectional area of the air pocket's outlet, and wherein the pocket outlets overlap.

17. A viscous drag reducing cladding comprising an outer surface with a plurality of air pockets therein, each air pocket having an air inlet and an outlet; wherein the cross-sectional area of each air inlet is smaller than the cross-sectional area of the air pocket's outlet, and wherein the outer surface of the viscous drag reducing cladding comprises a plurality of loops of hydrophobic thread where the loops are attached to said surface at both ends.

18. The viscous drag reducing cladding of claim 1, wherein the cross-sectional area of each air inlet is less than one hundredth of the cross-sectional area of the air pocket's outlet.

* * * * *